(12) United States Patent
Zhao

(10) Patent No.: US 9,720,658 B2
(45) Date of Patent: Aug. 1, 2017

(54) APPLICATION CREATION METHOD AND APPARATUS

(71) Applicant: Huawei Technologies Co., Ltd., Shenzhen (CN)

(72) Inventor: Qingwei Zhao, Shenzhen (CN)

(73) Assignee: Huawei Technologies, Co., Ltd., Shenzhen (CN)

( * ) Notice: Subject to any disclaimer, the term of this patent is extended or adjusted under 35 U.S.C. 154(b) by 0 days.

(21) Appl. No.: 14/953,912

(22) Filed: Nov. 30, 2015

(65) Prior Publication Data

US 2016/0085520 A1    Mar. 24, 2016

Related U.S. Application Data

(63) Continuation of application No. PCT/CN2014/075532, filed on Apr. 16, 2014.

(30) Foreign Application Priority Data

May 31, 2013    (CN) .......................... 2013 1 0213242

(51) Int. Cl.
*G06F 9/44*    (2006.01)
*G06F 3/0484*    (2013.01)

(52) U.S. Cl.
CPC ............ *G06F 8/34* (2013.01); *G06F 3/04842* (2013.01); *G06F 8/20* (2013.01); *G06F 8/35* (2013.01); *G06F 8/38* (2013.01)

(58) Field of Classification Search
CPC ................ G06F 8/20; G06F 8/35–8/38; G06F 3/0481–3/04897
(Continued)

(56) References Cited

U.S. PATENT DOCUMENTS

| 6,225,998 B1* | 5/2001 | Okita ........................ G06F 8/34 707/999.102 |
| 6,985,939 B2* | 1/2006 | Fletcher .................... G06F 8/20 707/999.002 |

(Continued)

FOREIGN PATENT DOCUMENTS

| CN | 1441346 A | 9/2003 |
| CN | 1459719 A | 12/2003 |

(Continued)

OTHER PUBLICATIONS

Basney, J., et al., "An OAuth Service for Issuing Certificates to Science Gateways for TeraGrid Users," Jul. 18-21, 2011, 6 pages.

(Continued)

*Primary Examiner* — Francisco Aponte
(74) *Attorney, Agent, or Firm* — Conley Rose, P.C.

(57) ABSTRACT

An application creation method, includes receiving, by the terminal, a property value of a component property configured by a user, generating a component model according to the property value of the component property, generating a component interface graphical element corresponding to the property value of the component property; mapping the component model as a function component model, graphically displaying the function component model as a function component graphical element according to the component interface graphical element, establishing an association relationship between different function component graphical elements in a to-be-created application according to an operation performed by the user on the function component graphical element, and generating a service function model according to the association relationship between the different function component graphical elements in the to-be-created application; and generating executable code of the (Continued)

to-be-created application according to the component model and the service function model.

11 Claims, 12 Drawing Sheets

(58) Field of Classification Search
USPC .................................................. 717/105, 109
See application file for complete search history.

(56) References Cited

U.S. PATENT DOCUMENTS

| | | | |
|---|---|---|---|
| 7,039,875 B2* | 5/2006 | Khalfay | G06F 8/38 715/744 |
| 7,536,676 B2* | 5/2009 | Baker | G06F 8/20 717/100 |
| 7,631,265 B1 | 12/2009 | Quinn | |
| 7,644,390 B2* | 1/2010 | Khodabandehloo | G06F 8/73 715/717 |
| 7,716,634 B2* | 5/2010 | Ross | G06F 8/34 717/106 |
| 7,761,856 B2* | 7/2010 | Griffin | G06F 9/45508 717/114 |
| 7,827,527 B1* | 11/2010 | Chiluvuri | G06F 8/30 717/104 |
| 7,849,440 B1* | 12/2010 | Englehart | G06F 8/34 715/762 |
| 7,979,243 B1 | 7/2011 | Mosterman et al. | |
| 8,112,739 B2* | 2/2012 | Anderson | G06F 8/34 717/106 |
| 8,527,943 B1* | 9/2013 | Chiluvuri | G06F 8/30 717/106 |
| 8,655,756 B2* | 2/2014 | Seubert | G06Q 20/102 705/35 |
| 8,677,249 B2* | 3/2014 | Buttner | G06F 3/0481 715/748 |
| 8,869,052 B2* | 10/2014 | Dattke | G06F 8/38 715/762 |
| 9,424,005 B1* | 8/2016 | Avadhanula | G06F 8/35 |
| 9,459,842 B1* | 10/2016 | Ogami | G06F 8/30 |
| 9,501,751 B1* | 11/2016 | Gautam | G06Q 10/06 |
| 2002/0104071 A1* | 8/2002 | Charisius | G06F 8/20 717/109 |
| 2003/0035006 A1 | 2/2003 | Kodosky et al. | |
| 2004/0036719 A1 | 2/2004 | Van Treeck | |
| 2004/0090458 A1* | 5/2004 | Yu | G06F 9/45512 715/760 |
| 2005/0066287 A1* | 3/2005 | Tattrie | G06F 9/4443 715/769 |
| 2006/0015844 A1* | 1/2006 | Johnson | G06F 8/36 717/106 |
| 2006/0074730 A1* | 4/2006 | Shukla | G06Q 10/06 705/7.27 |
| 2006/0200799 A1 | 9/2006 | Wills et al. | |
| 2006/0206863 A1* | 9/2006 | Shenfield | G06F 8/10 717/107 |
| 2006/0225032 A1* | 10/2006 | Klerk | G06Q 10/10 717/105 |
| 2008/0059504 A1* | 3/2008 | Barbetta | G06F 8/38 |
| 2011/0314343 A1* | 12/2011 | Hoke | G06F 11/3696 714/45 |
| 2013/0185240 A1* | 7/2013 | Ward | G06F 8/34 706/47 |

FOREIGN PATENT DOCUMENTS

| | | |
|---|---|---|
| CN | 101114226 A | 1/2008 |
| CN | 102222006 A | 10/2011 |
| CN | 102609271 A | 7/2012 |
| CN | 102654833 A | 9/2012 |

OTHER PUBLICATIONS

Myers, B., et al., "Graphical User Interface Programming," 2004, 29 pages.
Foreign Communication From a Counterpart Application, PCT Application No. PCT/CN2014/075532, English Translation of International Search Report dated Jul. 2, 2014, 4 pages.
Foreign Communication From a Counterpart Application, PCT Application No. PCT/CN2014/075532, English Translation of Written Opinion dated Jul. 2, 2014, 10 pages.
Machine Translation and Abstract of Chinese Publication No. CN1459719, Dec. 3, 2003, 6 pages.
Foreign Communication From A Counterpart Application, Chinese Application No. 201310213242.4, Chinese Office Action dated Feb. 15, 2017, 5 pages.

* cited by examiner

CONT. FROM FIG. 9A

CONT. FROM FIG. 9A

CONT. FROM FIG. 9A

907: Record an association relationship between function components that is designed by the user by performing color notation on a function component graphical element, to generate an association sequence of the function components 908: Record a function design presentation effect and the function component model, sequence and save a function design container code JSON format string, and sequence and save a function component model JSON format string 909: Generate a service function model according to the component model, a mapping relationship between the component model and the function component model, and the association sequence of the function components, and save the service function model 910: Generate HTML code and javascript code according to the component model and the service function model

FIG. 9B

APPLICATION CREATION METHOD AND APPARATUS

CROSS-REFERENCE TO RELATED APPLICATIONS

This application is a continuation of International Application No. PCT/CN2014/075532, filed on Apr. 16, 2014, which claims priority to Chinese Patent Application No. 201310213242.4, filed on May 31, 2013, both of which are hereby incorporated by reference in their entireties.

TECHNICAL FIELD

The present disclosure belongs to the field of computer technologies, and relates to application development technologies, and in particular to, an application creation method and apparatus.

BACKGROUND

With the rapid development of a mobile internet, it is an inevitable trend that mobile application software is developed for the broad masses of common users, so that ordinary people can conveniently and rapidly develop mobile application software.

However, in a current application development technology, although a visual interface technology can be used to enable development personnel to complete interface design by dragging a component, when a program function is developed based on a component model on an interface, the development personnel still need to perform configuration in a manner of description in language and writing, that is, perform code development, which requires application developers to be proficient in a programming language and also results in low development efficiency.

Therefore, the prior art cannot meet the requirements, and how a program function is further fully graphically developed based on a visual user interface (UI) component model to enable even ordinary personnel to easily and rapidly develop a program function has become a hotspot and a difficulty in research in the graphical development field.

SUMMARY

For defects existing in the prior art, embodiments of the present disclosure provide an application creation method and apparatus, so as to graphically create an application.

According to a first aspect, an application creation method is provided, where the method is applied to a terminal having a display device, and includes receiving a property value that is of a component property and that is configured by a user, generating a component model according to the property value of the component property, and rendering, according to the component model, a predefined graphical element that is of the component model and that is on a component interface, to acquire a component interface graphical element corresponding to the property value of the component property; mapping the component model as a function component model, graphically displaying the function component model as a function component graphical element according to the component interface graphical element, graphically establishing an association relationship between different function component graphical elements in a to-be-created application according to an operation performed by the user on the function component graphical element, and generating a service function model according to the association relationship between the different function component graphical elements in the to-be-created application; and generating executable code of the to-be-created application according to the component model and the service function model.

In a first possible implementation manner of the first aspect, the rendering, according to the component model, a predefined graphical element that is of the component model and that is on a component interface, to acquire a component interface graphical element corresponding to the property value of the component property includes generating component model code according to a property value of a component interface presentation format in the component property and a property value of component interface presentation data in the component property; and generating the component interface graphical element according to the component model code.

In a second possible implementation manner of the first aspect, the mapping the component model as a function component model, and graphically displaying the function component model as a function component graphical element according to the component interface graphical element includes mapping a component property of the component model as a function component property of the function component model; mapping a key component identifier of the component model as a key function component identifier of the function component model; acquiring, according to the key component identifier of the component model, function component presentation code corresponding to the key function component identifier; or generating, according to a property value of a component presentation format of the component model corresponding to the key component identifier and a property value of component interface presentation data, function component presentation code corresponding to the key function component identifier; and rendering, according to location coordinates of the component model corresponding to the key component identifier and at location coordinates corresponding to a function component interface, the function component graphical element according to the function component presentation code.

With reference to the second possible implementation manner of the first aspect, in a third possible implementation manner of the first aspect, the rendering, according to location coordinates of the component model corresponding to the key component identifier and at location coordinates corresponding to a function component interface, the function component graphical element according to the function component presentation code includes calling a graphical operation interface of a drawing tool preset on the terminal, and rendering, according to the location coordinates corresponding to the key component identifier and at the location coordinates corresponding to the function component interface, a function component interface graphical element according to the function component presentation code; and automatically associating and mapping the function component property graphical element according to the component property of the component model.

In a fourth possible implementation manner of the first aspect, the graphically displaying the function component model as a function component graphical element includes automatically creating a three-dimensional model of the function component graphical element by using a three-dimensional presentation space capability of a drawing tool preset on the terminal, and performing hierarchical display according to a component display layer configured by the user.

With reference to the fourth possible implementation manner of the first aspect, in a fifth possible implementation manner of the first aspect, the performing hierarchical display according to a component display layer configured by the user includes searching for all function component graphical elements whose component type is an application programming interface (API); setting a display layer of the API-type function component interface graphical element to a bottom layer value, so that the API-type function component interface graphical element is displayed at a bottom layer; and setting a display layer of an input and output property graphical element corresponding to the API-type function component interface graphical element to 1 plus the display layer of the API-type function component interface graphical element, so that the affiliated input and output property graphical element is superimposed and displayed on the API-type function component interface graphical element; and searching for all function component graphical elements whose component type is a visual UI type; and displaying the UI-type function component graphical element according to a display layer of the UI-type function component graphical element.

In the sixth possible implementation manner of the first aspect, the graphically establishing an association relationship between different function component graphical elements in a to-be-created application according to an operation performed by the user on the function component graphical element includes receiving a notation color message used by the user to perform color notation on the function component graphical element, where the notation color message includes a notation color, a notation time stamp, and a key function component identifier that is corresponding to the function component graphical element; generating a graphical element notation sequence according to the notation color, the notation time stamp, and the key function component identifier that is corresponding to the function component graphical element; and determining the association relationship between the different function component graphical elements in the to-be-created application according to the graphical element notation sequence.

With reference to the sixth possible implementation manner of the first aspect, in a seventh possible implementation manner of the first aspect, the determining the association relationship between the different function component graphical elements in the to-be-created application according to the graphical element notation sequence includes changing a foreground color of the function component graphical element to the notation color; and automatically generating, according to the foreground color of the function component graphical element and the notation time stamp corresponding to the function component graphical element, a notation order code used to indicate application function logic.

With reference to the first aspect, or any one of the first to seventh possible implementation manners of the first aspect, in an eighth possible implementation manner of the first aspect, the generating a service function model according to the association relationship between the different function component graphical elements in the to-be-created application includes generating an association sequence of the function component graphical elements according to the association relationship between the different function component graphical elements in the to-be-created application; and generating the service function model according to the association sequence of the graphical elements, the component model, and a mapping relationship between the component model and the function component graphical element.

With reference to the first aspect or any one of the first to seventh possible implementation manners of the first aspect, in a ninth possible implementation manner of the first aspect, the generating to-be-created executable code of the application according to the component model and the service function model includes reading, from the service function model, a property of a visual UI-type function component graphical element; acquiring, from a component model of a corresponding UI component on the component interface, a configured code generating template corresponding to the UI-type function component graphical element; and generating instant rendering component code according to the property of the UI-type function component graphical element and the corresponding configured code generating template; reading, from the service function model, a property of an API-type function component graphical element; acquiring, from a component model of a corresponding API component on the component interface, a configured code generating template corresponding to the API-type function component graphical element, and generating reference class library code according to a reference library declared by the API component; and generating API function code according to the property of the API-type function component graphical element, the corresponding configured code generating template, and the reference class library code; generating, according to the property of the function component graphical element and the association relationship between the different function component graphical elements in the to-be-created application, script code used to control interaction between the UI component and the API component; and generating the to-be-created executable code of the application according to the instant rendering component code, the API function code, and the script code.

According to a second aspect, an application creation apparatus is provided and disposed on a terminal having a display device, and includes a component model, a component design module, a function design module, and a code generating module, where the component design module is configured to receive a property value that is of a component property and that is configured by a user, generate the component model according to the property value of the component property, and render, according to the component model, a predefined graphical element that is of the component model and that is on a component interface, to acquire a component interface graphical element corresponding to the property value of the component property; the function design module is configured to map the component model as a function component model, graphically display the function component model as a function component graphical element according to the component interface graphical element, graphically establish an association relationship between different function component graphical elements in a to-be-created application according to an operation performed by the user on the function component graphical element, and generate a service function model according to the association relationship between the different function component graphical elements in the to-be-created application; and the code generating module is configured to generate executable code of the to-be-created application according to the component model and the service function model.

In a first possible implementation manner of the second aspect, the component design module is configured to generate component model code according to a property value of a component interface presentation format in the component property and a property value of component interface presentation data in the component property; and generate the component interface graphical element according to the component model code.

In a second possible implementation manner of the second aspect, the function design module is configured to map a component property of the component model as a function component property of the function component model; map a key component identifier of the component model as a key function component identifier of the function component model; acquire, according to the key component identifier of the component model, function component presentation code corresponding to the key function component identifier; or generate, according to a property value of a component presentation format of the component model corresponding to the key component identifier and a property value of component interface presentation data, function component presentation code corresponding to the key function component identifier; and render, according to location coordinates of the component model corresponding to the key component identifier and at location coordinates corresponding to a function component interface, the function component graphical element according to the function component presentation code.

With reference to the second possible implementation manner of the second aspect, in a third possible implementation manner of the second aspect, the function design module is further configured to call a graphical operation interface of a drawing tool preset on the terminal, and render, according to the location coordinates corresponding to the key component identifier and at the location coordinates corresponding to the function component interface, a function component interface graphical element according to the function component presentation code; and automatically associate and map the function component property graphical element according to the component property of the component model.

In a fourth possible implementation manner of the second aspect, the function design module is configured to automatically create a three-dimensional model of the function component graphical element by using a three-dimensional presentation space capability of a drawing tool preset on the terminal, and perform hierarchical display according to a component display layer configured by the user.

With reference to the fourth possible implementation manner of the second aspect, in a fifth possible implementation manner of the second aspect, the function design module is configured to search for all function component graphical elements whose component type is an API; set a display layer of the API-type function component interface graphical element to a bottom layer value, so that the API-type function component interface graphical element is displayed at a bottom layer; and set a display layer of an input and output property graphical element corresponding to the API-type function component interface graphical element to 1 plus the display layer of the API-type function component interface graphical element, so that the affiliated input and output property graphical element is superimposed and displayed on the API-type function component interface graphical element; and search for all function component graphical elements whose component type is a visual UI; and display the UI-type function component graphical element according to a display layer of the UI-type function component graphical element.

In a sixth possible implementation manner of the second aspect, the function design module is configured to receive a notation color message used by the user to perform color notation on the function component graphical element, where the notation color message includes a notation color, a notation time stamp, and a key function component identifier that is corresponding to the function component graphical element; generate a graphical element notation sequence according to the notation color, the notation time stamp, and the key function component identifier that is corresponding to the function component graphical element; and determine the association relationship between the different function component graphical elements in the to-be-created application according to the graphical element notation sequence.

With reference to the sixth possible implementation manner of the second aspect, in a seventh possible implementation manner of the second aspect, the function design module is further configured to change a foreground color of the function component graphical element to the notation color; and automatically generate, according to the foreground color of the function component graphical element and the notation time stamp corresponding to the function component graphical element, a notation order code used to indicate application function logic.

With reference to the second aspect or any one of the first to seventh possible implementation manners of the second aspect, in an eighth possible implementation manner of the second aspect, the function design module is further configured to generate an association sequence of the function component graphical elements according to the association relationship between the different function component graphical elements in the to-be-created application; and generate the service function model according to the association sequence of the graphical elements, the component model, and a mapping relationship between the component model and the function component graphical element.

With reference to the second aspect or any one of the first to seventh possible implementation manners of the second aspect, in a ninth possible implementation manner of the second aspect, the code generating module is configured to read, from the service function model, a property of a visual UI-type function component graphical element; acquire, from a component model of a corresponding UI component on the component interface, a configured code generating template corresponding to the UI-type function component graphical element; and generate instant rendering component code according to the property of the UI-type function component graphical element and the corresponding configured code generating template; read, from the service function model, a property of an API-type function component graphical element; acquire, from a component model of a corresponding API component on the component interface, a configured code generating template corresponding to the API-type function component graphical element, and generate reference class library code according to a reference library declared by the API component; and generate API function code according to the property of the API-type function component graphical element, the corresponding configured code generating template, and the reference class library code; generate, according to the property of the function component graphical element and the association relationship between the different function component graphical elements in the to-be-created application, script code used to control interaction between the UI component and the API component; and generate the to-be-created executable code of the application according to the instant rendering component code, the API function code, and the script code.

According to the application creation method and apparatus provided by the embodiments of the present disclosure, a function component graphical element is created by using a component model configured by a user by using a graphical component interface, and an association relationship, during implementation of an application, between function component graphical elements is determined according to an operation performed by the user on the function component graphical element; further, a service function model used for representing a program function is generated with reference to the function component graphical element and the association relationship, and executable code of the application is generated according to the component model and the service function model. Therefore, component design and service function design are combined with each other, which implements, in a complete application creation process, code-free development performed by the user based on a visual interface, and simplifies an application creation process, so that application creation and development efficiency is high.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. The accompanying drawings in the following description show merely some embodiments of the present disclosure, and persons of ordinary skill in the art may still derive other drawings from these accompanying drawings without creative efforts.

FIG. 9A and FIG. 9B are a schematic flowchart of Example 2 of creating an application by using an application creation apparatus according to an embodiment of the present disclosure;

DETAILED DESCRIPTION

An application creation method according to an embodiment of the present disclosure is applied to a terminal having a display device, and is executed by, for example, an application creation apparatus. The application creation apparatus has a visual interface, namely, a display device. A user can create an application by operating the visual interface. The application creation method according to this embodiment of the present disclosure is described in the following from a perspective of the application creation apparatus.

Figure 1:
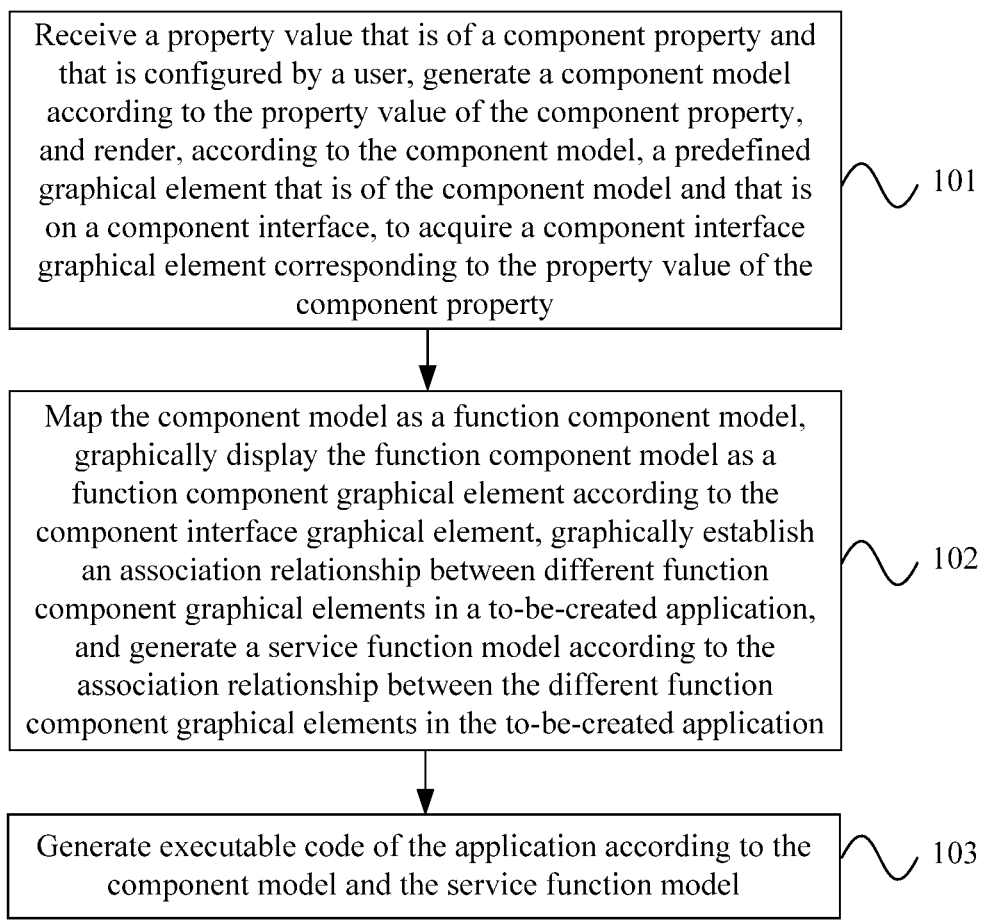
FIG. 1 is a schematic flowchart of an application creation method according to an embodiment of the present disclosure.

FIG. 1 is a schematic flowchart of an application creation method according to an embodiment of the present disclosure. As shown in FIG. 1, the application creation method includes the following steps.

Step 101: Receive a property value that is of a component property and that is configured by a user, generate a component model according to the property value of the component property, and render, according to the component model, a predefined graphical element that is of the component model and that is on a component interface, to acquire a component interface graphical element corresponding to the property value of the component property.

An application creation apparatus provides a to-be-designed component property of a component for the user in a graphical manner, updates real-time design information of the user in a predefined component model to generate the component model, and renders, according to a property of the component model, the predefined graphical element that is on the component interface and that is corresponding to the component model, to acquire the corresponding component interface graphical element. Rendering refers to generating a graphical element according to a property of a component model.

A functional entity provided by the component model includes, for example, a visual UI component: an entity defining a form element on an interface; an API component: a data processing capability component provided by a service platform or introduced from a third party; and a model operation interface: an interface by means of which a component model is read or updated according to component information.

A property of a component that can be designed by the user includes, for example, three types of properties: an event that can be triggered by the component, an external interaction interface and parameter of the component, and component presentation information.

A component-triggering event includes, for example, click, double-click, tap, and swipe.

An interaction function and parameter supported by the component is, for example, setData(data), getData( ) hide( ) or getLocation( ) a format of external interaction function property data is, for example, {name: "",
alias: "",
    icon: "", //used for displaying an icon corresponding to an API -continued

```
  component
  input:{parameter:{name:"",alias: "", default:"", nullable:""}}, //input
  output: {name:"",alias:""} //output
}
```

The component presentation information includes, for example, layout, type (style), format, data, visible, index, width, and/or height.

The property of the component that can be designed by the user includes, for example, a component interface presentation format, component interface presentation data, a component display layer, location coordinates of the component, a name of the component-triggering event, a name of the external interaction interface of the component, a name of an interface-related parameter, and a component type. The application creation apparatus acquires the property value, input by the user, of the component property, and updates the acquired property value of the component property into the predefined component model. An initialized property value of each component property is predefined in the predefined component model, and the initialized property value may be null. For example, a component model is predefined as follows:

```
{ID: "", //a key component identifier
Name:"", //a component name
    Type:"UI/API", //a component type, a UI or an API
    Icon: "", //an icon format
    Width:"", //location coordinates (in a horizontal direction) of a
    component
    Height:   "", //location coordinates (in a vertical direction) of a
    component
    Zindex:"", //a component display layer
    Functions:{function:"a format of external interaction function
property data"}, //an interaction function and parameter supported by
the component
            Events:{{name:"",alias:""},{...}} //a component-triggering
            event
    }
```

Step 102: Map the component model as a function component model, graphically display the function component model as a function component graphical element according to the component interface graphical element, graphically establish an association relationship between different function component graphical elements in a to-be-created application, and generate a service function model according to the association relationship between the different function component graphical elements in the to-be-created application.

The function component graphical element includes a function component interface graphical element and a function component property graphical element affiliated to the function component interface graphical element.

The application creation apparatus further provides a service development function for the user in a graphical manner to design an association relationship between developed components, so as to generate the service function model. The application creation apparatus maps the component model obtained in step 101 as the function component model and graphically displays the function component model as the function component graphical element. The displayed function component graphical element includes the function component interface graphical element and the function component property graphical element. The function component interface graphical element is used to identify the function component model, and the function component interface graphical element may be displayed in a same display manner as a corresponding component model on a component interface. The function component property graphical element is generated according to an event property and a function property that are corresponding to the function component model, and is affiliated to and displayed around the function component interface graphical element or overlaps the function component interface graphical element and is on the function component interface graphical element.

The user operates the function component graphical element according to an implementation procedure of the to-be-created application by using a human-machine interaction interface of the application creation apparatus, for example, performing notation on the function component graphical element, or performing a drag operation on the function component graphical element. The application creation apparatus acquires an operation performed by the user on the function component graphical element, and determines, according to the operation performed by the user, an association relationship between function component graphical elements that implement different functions and that are in the to-be-created application, for example, an execution order. The application creation apparatus can generate the service function model according to the function component graphical elements and the determined association relationship between the function component graphical elements.

Step 103: Generate executable code of the application according to the component model and the service function model.

The application creation apparatus generates an executable application in a form of code according to the component model and the service function model after executing the foregoing step 101 and step 102, and can provide a corresponding application service by loading and running the executable application.

According to the application creation method in this embodiment of the present disclosure, a function component graphical element is created by using a component model configured by a user by using a graphical component interface, and an association relationship, during implementation of an application, between function component graphical elements is determined according to an operation performed by the user on the function component graphical element; further, a service function model used for representing a program function is generated with reference to the function component graphical element and the association relationship, and executable code of the application is generated according to the component model and the service function model. Therefore, component design and service function design are combined with each other, which implements, in a complete application creation process, code-free development performed by the user based on a visual interface, and simplifies an application creation process, so that application creation and development efficiency is high.

Figure 2:
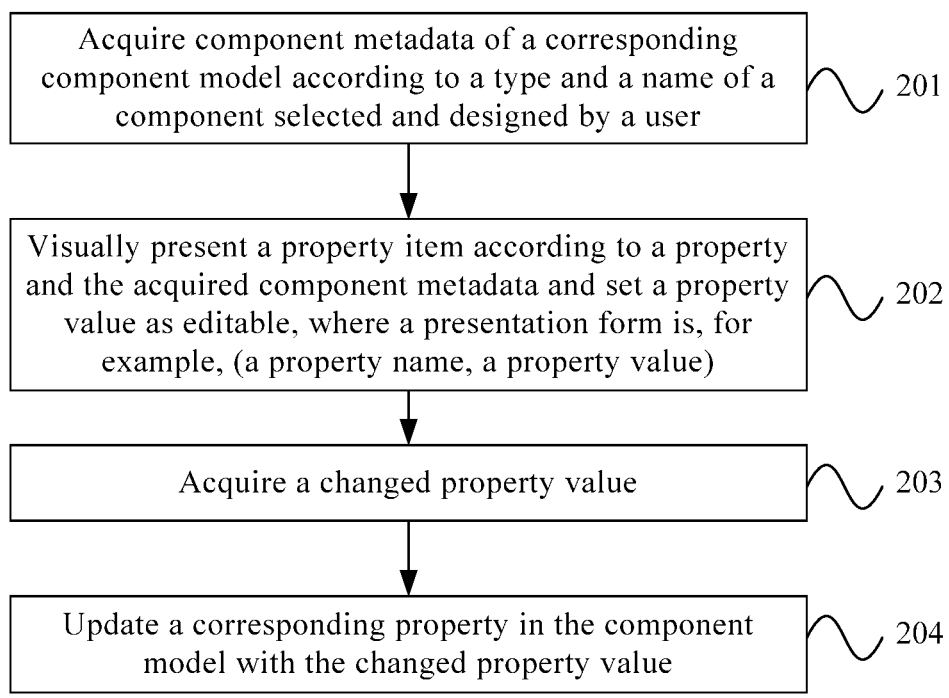
FIG. 2 is a schematic flowchart of an example of updating a component model in an application creation method according to an embodiment of the present disclosure.

Further, according to the application creation method in this embodiment of the present disclosure, the process of receiving the property value that is of the component property and that is configured by the user and generating the component model according to the property value of the component property is, for example, detecting, by the application creation apparatus, a change in the component property according to a procedure shown in FIG. 2, recording a changed property value, and updating a corresponding property value in the component model with the changed value.

FIG. 2 is a schematic flowchart of an example of updating a component model in an application creation method according to an embodiment of the present disclosure. As shown in FIG. 2, the example includes the following steps.

Step 201: Acquire component metadata of a corresponding component model according to a type and a name of a component selected and designed by a user.

Step 202: Graphically present a property item according to a property and the acquired component metadata and set a property value as editable, where a presentation form is, for example, (a property name, a property value).

Step 203: Acquire a changed property value.

Step 204: Update a corresponding property in the component model with the changed property value.

Further, in the application creation method in this embodiment of the present disclosure, the rendering, according to the component model, a predefined graphical element that is of the component model and that is on a component interface, to acquire a corresponding component interface graphical element includes generating component model code according to a property value of a component interface presentation format and a property value of component interface presentation data; and generating the component interface graphical element according to the component model code.

Further, in the application creation method in this embodiment of the present disclosure, the mapping the component model as a function component model, and graphically displaying the function component model as a function component graphical element according to the component interface graphical element includes mapping a component property of the component model as a function component property of the function component model; mapping a key component identifier of the component model as a key function component identifier of the function component model; acquiring, according to the key component identifier of the component model, function component presentation code corresponding to the key function component identifier; or generating, according to a property value of a component presentation format of the component model corresponding to the key component identifier and a property value of component interface presentation data, function component presentation code corresponding to the key function component identifier; and rendering, according to location coordinates of the component model corresponding to the key component identifier and at location coordinates corresponding to a function component interface, the function component graphical element according to the function component presentation code.

In the foregoing process of rendering the function component graphical element, the application creation apparatus dynamically generates a corresponding function component model according to the generated component model, where the function component model mainly includes the following properties: a key function component identifier (ID); the function component presentation code (a graphical element presentation format, graphical element presentation data, a icon of a graphical element, and a size of the graphical element), where a presentation effect is consistent with a component design effect; a function component type (a UI component/an API component); an interaction function and parameter supported by a function component; a trigger event supported by the function component, a display layer zindex value of the function component; and display location coordinates corresponding to the function component.

The function component model is defined as, for example,

```
{
    ID:"",
    UnitDisplayCode:"",
    Type:"",
    Events: "{event{name:"",alias: ""},{...}}",
Functions:
{
function:{
name:"",alias:"",
parameters:
{
parameter:{name:"",alias:"",default:""}
}
}
},
    Zindex: ""
    Location:{x:"", y:""}
}
```

Figure 3:
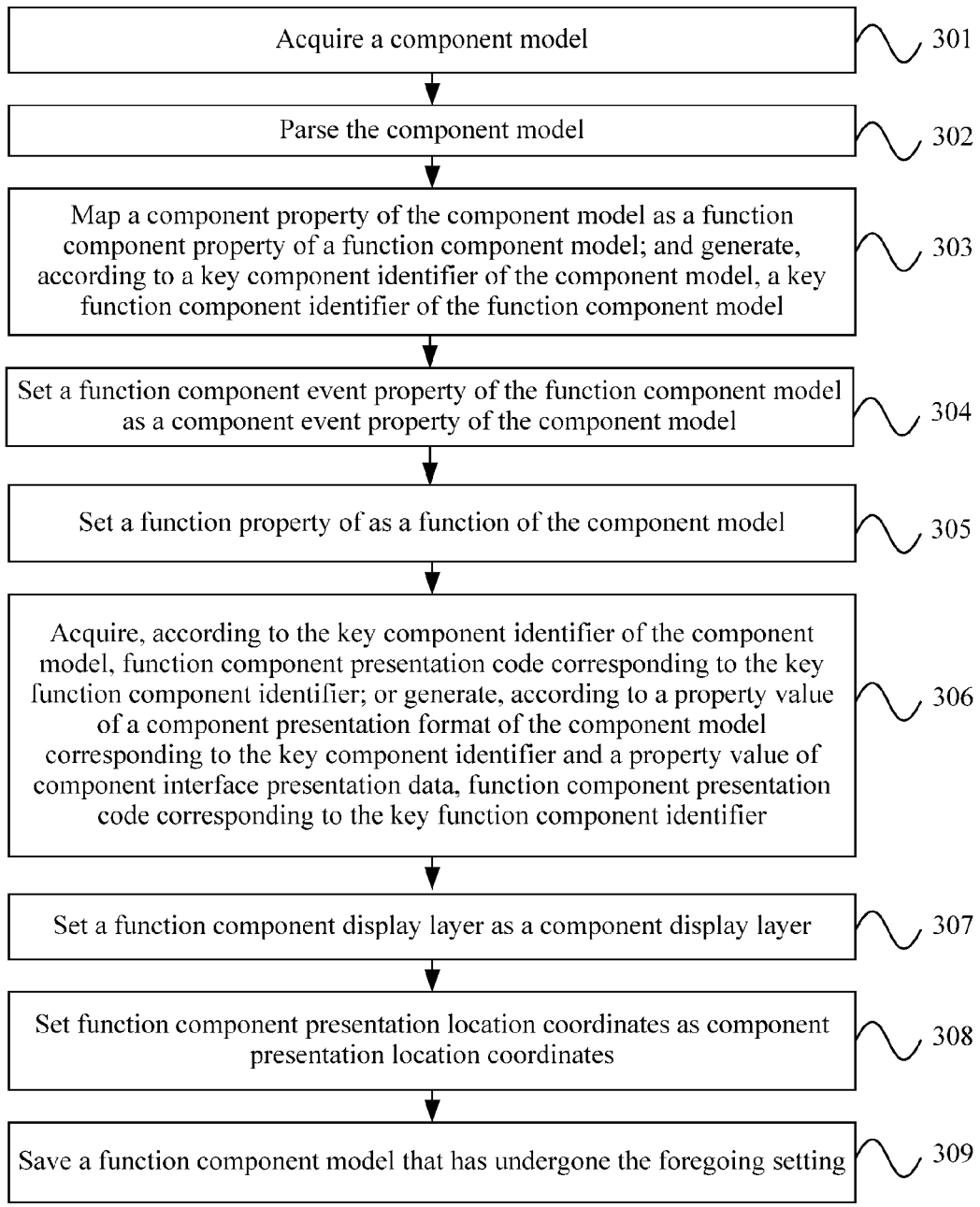
FIG. 3 is a schematic flowchart of an example of generating a function component model in an application creation method according to an embodiment of the present disclosure.

FIG. 3 is a schematic flowchart of an example of generating a function component model in an application creation method according to an embodiment of the present disclosure. As shown in FIG. 3, the example includes the following steps.

Step 301: Acquire a component model.

Step 302: Parse the component model.

Step 303: Map a component property of the component model as a function component property of a function component model; and generate, according to a key component identifier of the component model, a key function component identifier of the function component model.

For example, any string is added to the key component identifier of the component model to generate the key function component identifier.

Step 304: Set a function component event property (namely, an event that can be designed and that is supported by a component) of the function component model as a component event property (namely, a name of a component-triggering event) of the component model.

Step 305: Set a function property (namely, a supported interaction function and parameter) of a function component as a function (namely, a name of an external interaction interface of the component, and a name of an interface-related parameter) of the component model.

Step 306: Acquire, according to the key function component identifier of the function component model, function component presentation code corresponding to the key function component identifier; or generate, according to a property value of a component presentation format of the component model corresponding to the key component identifier and a property value of component interface presentation data, function component presentation code corresponding to the key function component identifier.

Step 307: Set a function component display layer as a component display layer.

Step 308: Set function component presentation location coordinates as component presentation location coordinates.

Step 309: Save a function component model that has undergone the foregoing setting.

After the function component model is generated by using a procedure shown in FIG. 3, a mapping relationship between the function component and the component is established according to the key function component identifier and the key component identifier, and the function component is automatically presented according to the function component presentation location coordinates, the display layer, and the function component presentation code that are corresponding to the function component model.

The automatically displaying the function component includes calling a graphical operation interface of a drawing tool (for example, Canvas or scalable vector graphics (SVG)) preset on a terminal, and drawing, according to the location coordinates corresponding to the key component identifier and at the location coordinates corresponding to a function component interface, a function component interface graphical element according to the function component presentation code; and automatically associating and mapping the function component property graphical element. A property of the function component interface graphical element is automatically associated based on the component property of the component model, and a function component part unit, namely the function component property graphical element, which graphically presents an event property and a function property of a component, is automatically generated according to the event property and the function property that are corresponding to the function component, and is affiliated to and presented around the function component interface graphical element or overlaps the function component interface graphical element and is on the function component interface graphical element. The process of automatically associating and mapping the function component property graphical element is, for example, mapping component properties of the component model as function component property graphical elements in a one-to-one manner.

Figure 4:
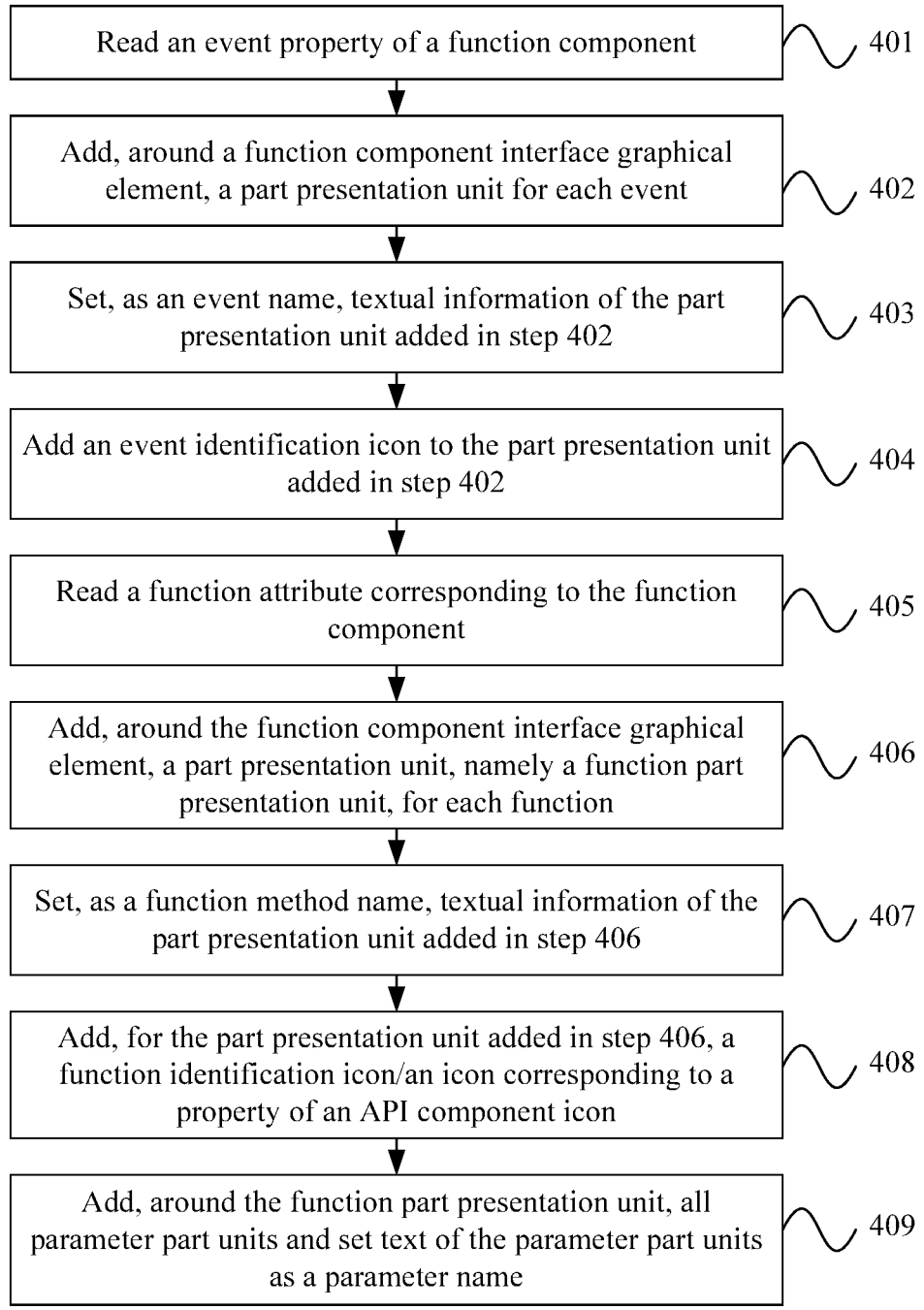
FIG. 4 is a schematic flowchart of an example of presenting a function component property graphical element in an application creation method according to an embodiment of the present disclosure.

FIG. 4 is a schematic flowchart of an example of presenting a function component property graphical element in an application creation method according to an embodiment of the present disclosure. As shown in FIG. 4, the example includes the following steps.

Step 401: Read an event property of a function component.

Step 402: Add, around a function component interface graphical element, a part presentation unit for each event.

Step 403: Set, as an event name, textual information of the part presentation unit added in step 402.

Step 404: Add an event identification icon to the part presentation unit added in step 402.

Step 405: Read a function property corresponding to the function component.

Step 406: Add, around the function component interface graphical element, a part presentation unit, namely a function part presentation unit, for each function.

Step 407: Set, as a function method name, textual information of the part presentation unit added in step 406.

Step 408: Add, for the part presentation unit added in step 406, a function identification icon/an icon corresponding to a property of an API component icon.

Step 409: Add, around the function part presentation unit, all parameter part units and set text of the parameter part units as a parameter name.

Thus, an operation of rendering a function component graphical element is completed.

Further, in the application creation method in this embodiment of the present disclosure, in addition to rendering the function component graphical element by using procedures shown in FIG. 3 and FIG. 4, a three-dimensional model of the function component graphical element may be further automatically created by using a three-dimensional presentation space capability of a drawing tool preset on a terminal, and hierarchical display is performed according to a component display layer configured by a user.

The performing hierarchical display according to a component display layer configured by a user includes searching for all function component graphical elements whose component type is an API; setting a display layer of the API-type function component interface graphical element to a bottom layer value, so that the API-type function component interface graphical element is displayed at a bottom layer; and setting a display layer of an input and output property graphical element corresponding to the API-type function component interface graphical element to 1 plus the display layer of the API-type function component interface graphical element, so that the affiliated input and output property graphical element is superimposed and displayed on the API-type function component interface graphical element; searching for all function component graphical elements whose component type is a UI; and displaying the UI-type function component graphical element according to a display layer of the UI-type function component graphical element, where the user may further control, by changing a display layer of the function component graphical element, the function component graphical element to be in a displayed state or in a hidden state.

By using the application creation method according to this embodiment of the present disclosure, a function component graphical element is displayed more intuitively and more vividly.

Further, in the application creation method in this embodiment of the present disclosure, the graphically establishing an association relationship between different function component graphical elements in a to-be-created application includes receiving a notation color message used by the user to perform color notation on the function component graphical element, where the notation color message includes a notation color, a notation time stamp, and a key function component identifier that is corresponding to the function component graphical element; generating a graphical element notation sequence according to the notation color, the notation time stamp, and the key function component identifier that is corresponding to the function component graphical element; and determining the association relationship between the different function component graphical elements in the to-be-created application according to the graphical element notation sequence.

The determining the association relationship between the different function component graphical elements in the to-be-created application according to the graphical element notation sequence includes changing a foreground color of the function component graphical element to the notation color; and automatically generating, according to the foreground color of the function component graphical element and the notation time stamp corresponding to the function component graphical element, a notation order code used to indicate application function logic.

Figure 5:
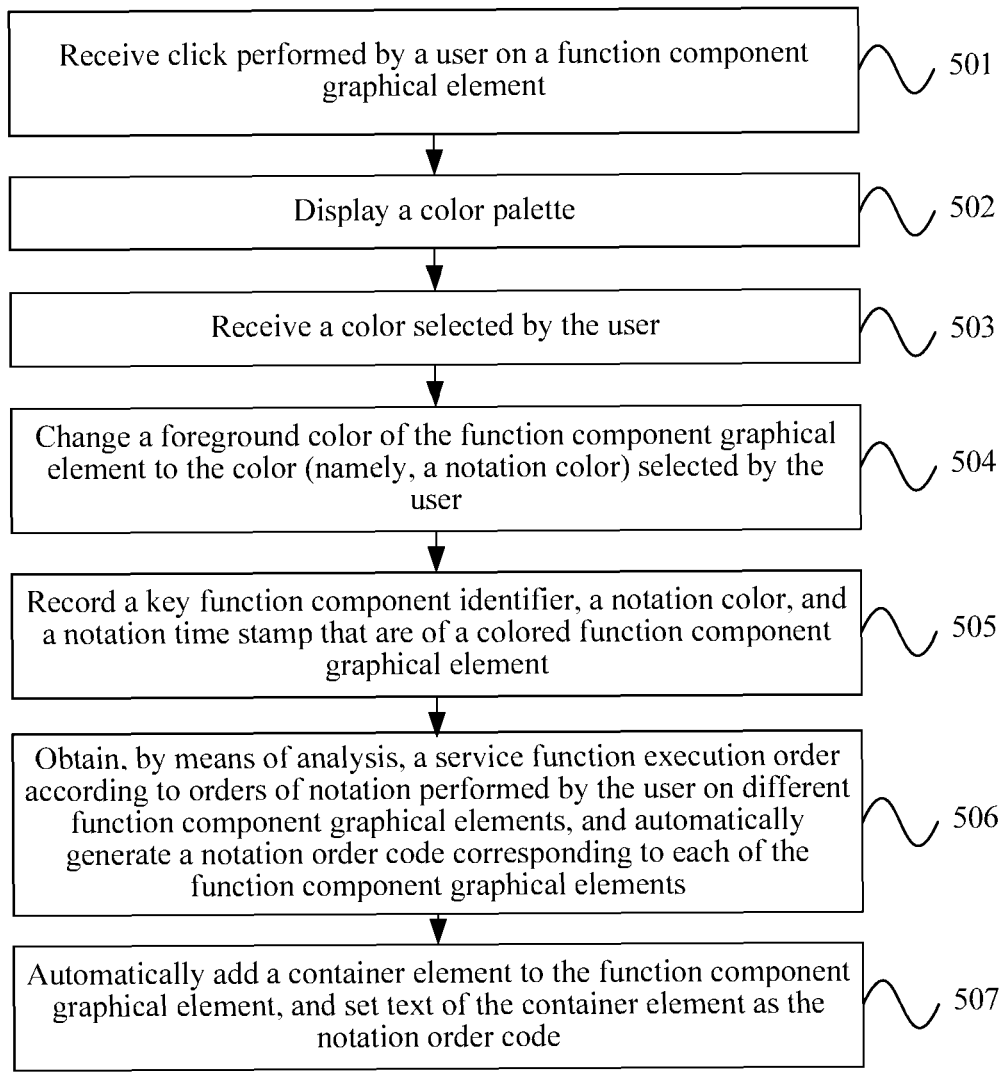
FIG. 5 is a schematic flowchart of an example of graphically establishing an association relationship between different function component graphical elements in the to-be-created application in an application creation method according to an embodiment of the present disclosure.

FIG. 5 is a schematic flowchart of an example of graphically establishing an association relationship between different function component graphical elements in the to-be-created application in an application creation method according to an embodiment of the present disclosure. As shown in FIG. 5, the example includes the following steps.

Step 501: Receive click performed by a user on a function component graphical element.

Step 502: Display a color palette.

Step 503: Receive a color selected by the user.

Step 504: Change a foreground color of the function component graphical element to the color (namely, a notation color) selected by the user.

Step 505: Record a key function component identifier, a notation color, and a notation time stamp that are of a colored function component graphical element.

Step 506: Obtain, by means of analysis, a service function execution order according to orders of notation performed by the user on different function component graphical elements, and automatically generate a notation order code corresponding to each of the function component graphical elements.

Further, the application creation method may further include the following step.

Step 507: Automatically add a container element to the function component graphical element, and set text of the container element as the notation order code.

According to the application creation method in this embodiment of the present disclosure, a user can complete setting of application execution logic by performing color notation on a function component graphical element, so that program function development efficiency is high, and in particular, when the function component graphical element is displayed as a three-dimensional model, using the color notation method leads to an effect of clearer graphical display.

Further, in the application creation method according to this embodiment of the present disclosure, in addition to graphically establishing an association relationship between function component graphical elements in a procedure shown in FIG. 5, a line may be automatically drawn by receiving a drag operation performed by a user, to connect a source function component graphical element and a target function component graphical element that are corresponding to the drag operation, and the association relationship between the function component graphical elements is recorded.

According to the application creation method in this embodiment of the present disclosure, by directly performing a drag operation on a function component graphical element, a user can complete setting of application execution logic, which is more intuitive and simpler.

Further, in the application creation method in this embodiment of the present disclosure, the generating a service function model according to the association relationship between the different function component graphical elements in the to-be-created application includes generating an association sequence of the function component graphical elements according to the association relationship between the different function component graphical elements in the to-be-created application; and generating the service function model according to the association sequence of the graphical elements, the component model, and a mapping relationship between the component model and the function component graphical element.

The association sequence of the function component graphical elements is, for example, defined as follows:

{object1.event:object2.method,objec2t.method.paral:object3,object2.out:object4, . . . }

":" is used to separate different function component graphical elements.

The service function model is, for example, defined as follows:

```
<function logic>
    <component>
        <component ID></component ID>
        <event>
            <event name></event name>
            <component>
                <component ID></component ID>
                <function>
```

-continued

```
                    <calling priority></calling priority>
                    <function name><function name>
                    <parameter>
                        <name></name>
                        <value-associated object>a UI
component ID (objectxxx)/xxxx</value-associated object>
                    </parameter>
                    <output>
                        <component ID></component ID>
                    </output>
                </function>
            </component>
        </event>
    </component>
</function logic>
```

Further, in the application creation method in this embodiment of the present disclosure, the graphically established association relationship between the different function component graphical elements in the to-be-created application is hierarchically presented in a tree structure or presented in a graded manner.

Further, in the application creation method in this embodiment of the present disclosure, the generating executable code of the application according to the component model and the service function model includes reading, from the service function model, a property of a UI-type function component graphical element; acquiring, from a component model of a corresponding UI component on the component interface, a configured code generating template corresponding to the UI-type function component graphical element; and generating instant rendering component code according to the property of the UI-type function component graphical element and the corresponding configured code generating template; reading, from the service function model, a property of an API-type function component graphical element; acquiring, from a component model of a corresponding API component on the component interface, a configured code generating template corresponding to the API-type function component graphical element, and generating reference class library code according to a reference library declared by the API component; and generating API function code according to the property of the API-type function component graphical element, the corresponding configured code generating template, and the reference class library code; generating, according to the property of the function component graphical element and the association relationship between the function component graphical elements, script code used to control interaction between the UI component and the API component; and generating the executable code of the application according to the instant rendering component code, the API function code, and the script code.

Figure 6:
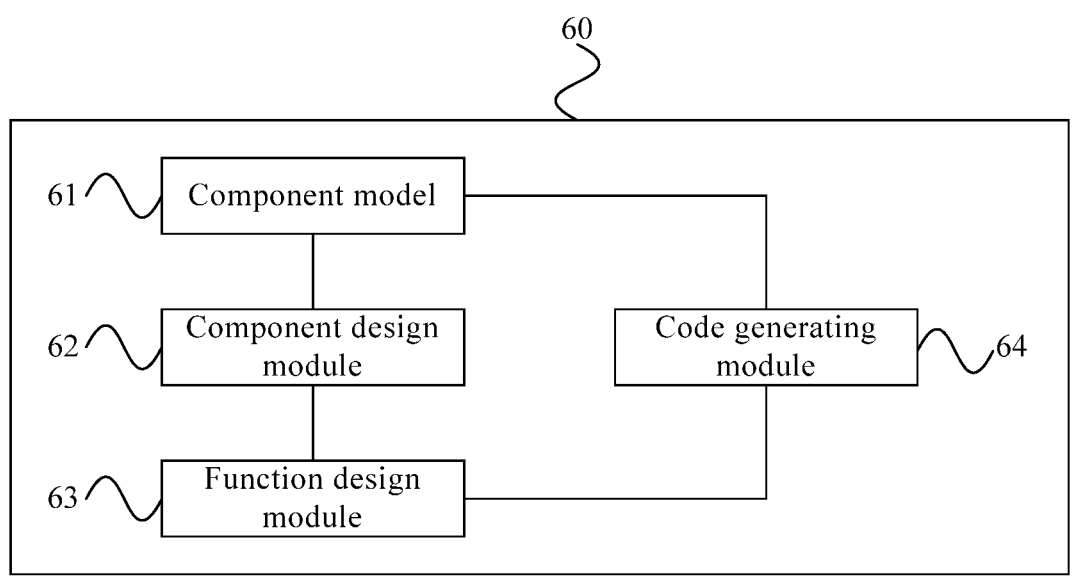
FIG. 6 is a schematic structural diagram of an application creation apparatus according to an embodiment of the present disclosure.

FIG. 6 is a schematic structural diagram of an application creation apparatus 60 according to an embodiment of the present disclosure. The application creation apparatus is disposed on a terminal having a display device. As shown in FIG. 6, the application creation apparatus 60 includes a component model 61, a component design module 62, a function design module 63, and a code generating module 64.

The component design module 62 is configured to receive a property value that is of a component property and that is configured by a user, generate the component model according to the property value of the component property, and render, according to the component model, a predefined graphical element that is of the component model and that is on a component interface, to acquire a component interface graphical element corresponding to the property value of the component property.

The function design module 63 is configured to map the component model as a function component model, graphically display the function component model as a function component graphical element according to the component interface graphical element, graphically establish an association relationship between different function component graphical elements in a to-be-created application according to an operation performed by the user on the function component graphical element, and generate a service function model according to the association relationship between the different function component graphical elements in the to-be-created application, where the function component graphical element includes a function component interface graphical element and a function component property graphical element affiliated to the function component interface graphical element.

The code generating module 64 is configured to generate executable code of the to-be-created application according to the component model and the service function model.

A specific procedure of creating an application by the application creation apparatus according to this embodiment of the present disclosure is the same as an application creation method according to an embodiment of the present disclosure, and therefore, details are not repeatedly described herein.

According to the application creation apparatus in this embodiment of the present disclosure, a function component graphical element is created by using a component model configured by a user by using a graphical component interface, and an association relationship, during implementation of an application, between function component graphical elements is determined according to an operation performed by the user on the function component graphical element; further. A service function model used for representing a program function is generated with reference to the function component graphical element and the association relationship, and executable code of the application is generated according to the component model and the service function model. Therefore, component design and service function design are combined with each other, which implements, in a complete application creation process, code-free development performed by the user based on a graphical interface, and simplifies an application creation process, so that application creation efficiency is high.

Further, the application creation apparatus in this embodiment of the present disclosure may further include a service running engine, which is configured to run the executable code generated by the code generating module, so as to provide an application service for the user.

Further, in the application creation apparatus in this embodiment of the present disclosure, the component property includes a component interface presentation format, component interface presentation data, a component display layer, location coordinates of a component, a name of a component-triggering event, a name of an external interaction interface of the component, a name of an interface-related parameter, and a component type.

Further, in the application creation apparatus in this embodiment of the present disclosure, the component design module is configured to generate component model code according to a property value of the component interface presentation format in the component property and a property value of the component interface presentation data in the component property; and generate the component interface graphical element according to the component model code.

Further, in the application creation apparatus in this embodiment of the present disclosure, the function design module is configured to map a component property of the component model as a function component property of the function component model; map a key component identifier of the component model as a key function component identifier of the function component model; acquire, according to the key component identifier of the component model, function component presentation code corresponding to the key function component identifier; or generate, according to a property value of a component presentation format of the component model corresponding to the key component identifier and a property value of component interface presentation data, function component presentation code corresponding to the key function component identifier; and render, according to location coordinates of the component model corresponding to the key component identifier and at location coordinates corresponding to a function component interface, the function component graphical element according to the function component presentation code.

Further, in the application creation apparatus in this embodiment of the present disclosure, the function design module is configured to call a graphical operation interface of a drawing tool preset on the terminal, and render, according to the location coordinates corresponding to the key component identifier and at the location coordinates corresponding to the function component interface, the function component interface graphical element according to the function component presentation code; and automatically associate and map the function component property graphical element according to the component property of the component model.

Further, in the application creation apparatus in this embodiment of the present disclosure, the function design module is further configured to automatically create a three-dimensional model of the function component graphical element by using a three-dimensional presentation space capability of the drawing tool preset on the terminal, and perform hierarchical display according to a component display layer configured by the user.

Further, in the application creation apparatus in this embodiment of the present disclosure, the function design module is further configured to search for all function component graphical elements whose component type is an API; set a display layer of the API-type function component interface graphical element to a bottom layer value, so that the API-type function component interface graphical element is displayed at a bottom layer; and set a display layer of an input and output property graphical element corresponding to the API-type function component interface graphical element to 1 plus the display layer of the API-type function component interface graphical element, so that the affiliated input and output property graphical element is superimposed and displayed on the API-type function component interface graphical element; and search for all function component graphical elements whose component type is a UI; and display the UI-type function component graphical element according to a display layer of the UI-type function component graphical element.

Further, in the application creation apparatus in this embodiment of the present disclosure, the function design module is further configured to control, by changing a display layer of the function component graphical element, the function component graphical element to be in a displayed state or in a hidden state.

Further, in the application creation apparatus in this embodiment of the present disclosure, the function design module is further configured to receive a notation color message used by the user to perform color notation on the function component graphical element, where the notation color message includes a notation color, a notation time stamp, and a key function component identifier that is corresponding to the function component graphical element; generate a graphical element notation sequence according to the notation color, the notation time stamp, and the key function component identifier that is corresponding to the function component graphical element; and determine the association relationship between the different function component graphical elements in the to-be-created application according to the graphical element notation sequence.

Further, in the application creation apparatus in this embodiment of the present disclosure, the function design module is configured to change a foreground color of the function component graphical element to the notation color; automatically generate, according to the foreground color of the function component graphical element and the notation time stamp corresponding to the function component graphical element, a notation order code used to indicate application function logic.

Further, in the application creation apparatus in this embodiment of the present disclosure, the function design module is further configured to automatically add a container element to the function component graphical element, and set text of the container element as the notation order code.

Further, in the application creation apparatus in this embodiment of the present disclosure, the function design module is further configured to receive a drag operation performed by the user, automatically draw a line to connect a source function component graphical element and a target function component graphical element that are corresponding to the drag operation, and record the association relationship between the different function component graphical elements in the to-be-created application.

Further, in the application creation apparatus in this embodiment of the present disclosure, the function design module is further configured to add any string to the key component identifier of the component model to generate the key function component identifier.

Further, in the application creation apparatus in this embodiment of the present disclosure, the function design module is further configured to generate an association sequence of the function component graphical elements according to the association relationship between the different function component graphical elements in the to-be-created application; and generate the service function model according to the association sequence of the graphical elements, the component model, and a mapping relationship between the component model and the function component graphical element.

Further, in the application creation apparatus in this embodiment of the present disclosure, the graphically established association relationship between the function component graphical elements is hierarchically presented in a tree structure or presented in a graded manner.

Further, in the application creation apparatus in this embodiment of the present disclosure, the function component graphical element has a same presentation effect as the corresponding component interface graphical element.

Further, in the application creation apparatus in this embodiment of the present disclosure, the code generating module is configured to read, from the service function model, a property of a UI-type function component graphical element; acquire, from a component model of a corresponding UI component on the component interface, a configured code generating template corresponding to the UI-type function component graphical element; and generate instant rendering component code according to the property of the UI-type function component graphical element and the corresponding configured code generating template; read, from the service function model, a property of an API-type function component graphical element; acquire, from a component model of a corresponding API component on the component interface, a configured code generating template corresponding to the API-type function component graphical element, and generate reference class library code according to a reference library declared by the API component; and generate API function code according to the property of the API-type function component graphical element, the corresponding configured code generating template, and the reference class library code; generate, according to the property of the function component graphical element and the association relationship between the function component graphical elements, script code used to control interaction between the UI component and the API component; and generate the executable code of the application according to the instant rendering component code, the API function code, and the script code.

Two specific examples are used in the following to describe in further detail a procedure of creating an application by using the application creation apparatus in this embodiment of the present disclosure.

EXAMPLE 1

A created application is a picture-taking service, which is a WEB service in which a picture-taking API component is called by clicking a button and a picture is displayed on an image component. The service is implemented by using JavaScript and cascading style sheets (CSS).

Related components that need to be used are an image UI component, a button UI component, and a picture-taking API component.

Figure 7A:
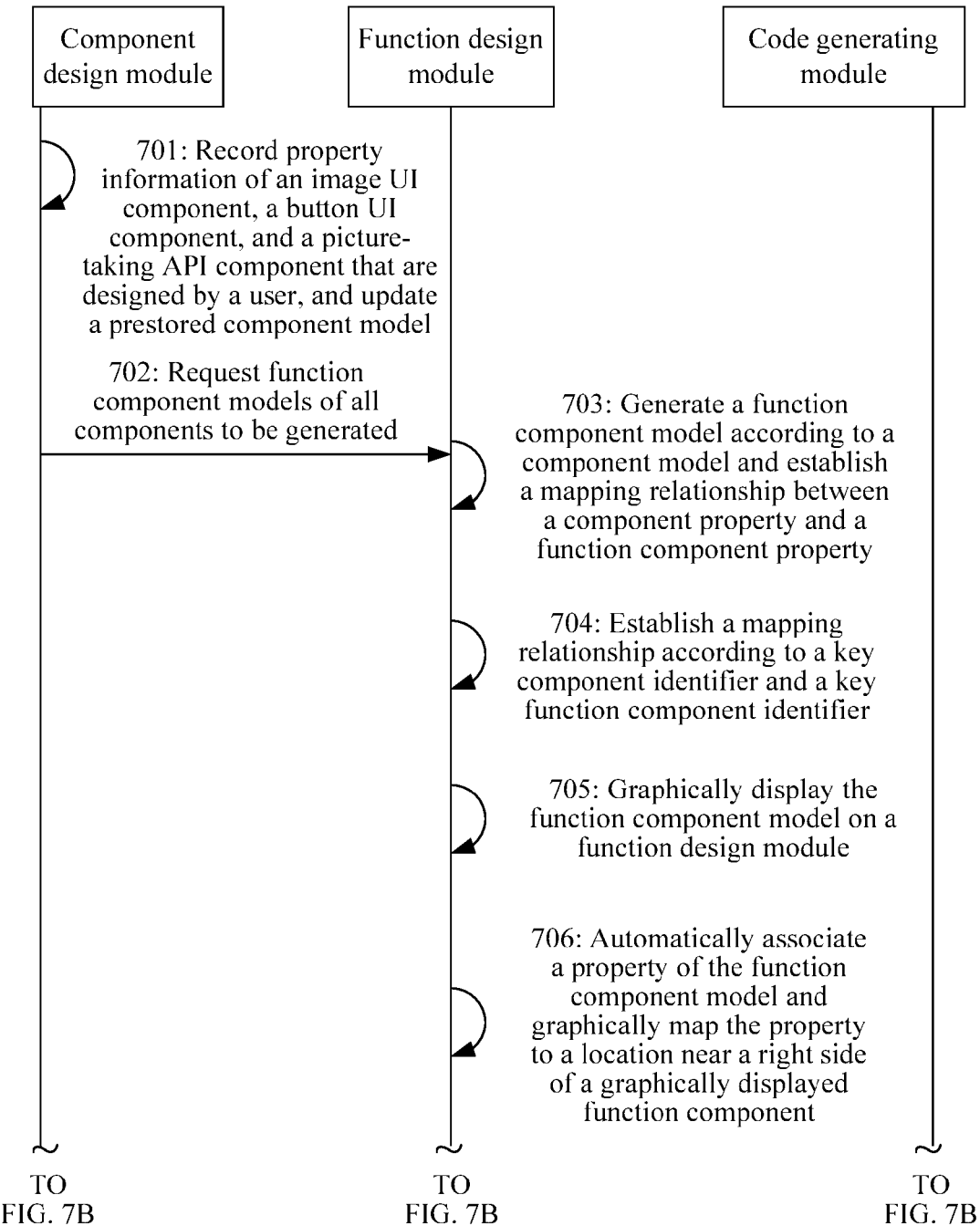
FIG. 7A and FIG. 7B are a schematic flowchart of Example 1 of creating an application by using an application creation apparatus according to an embodiment of the present disclosure.
Figure 7B:
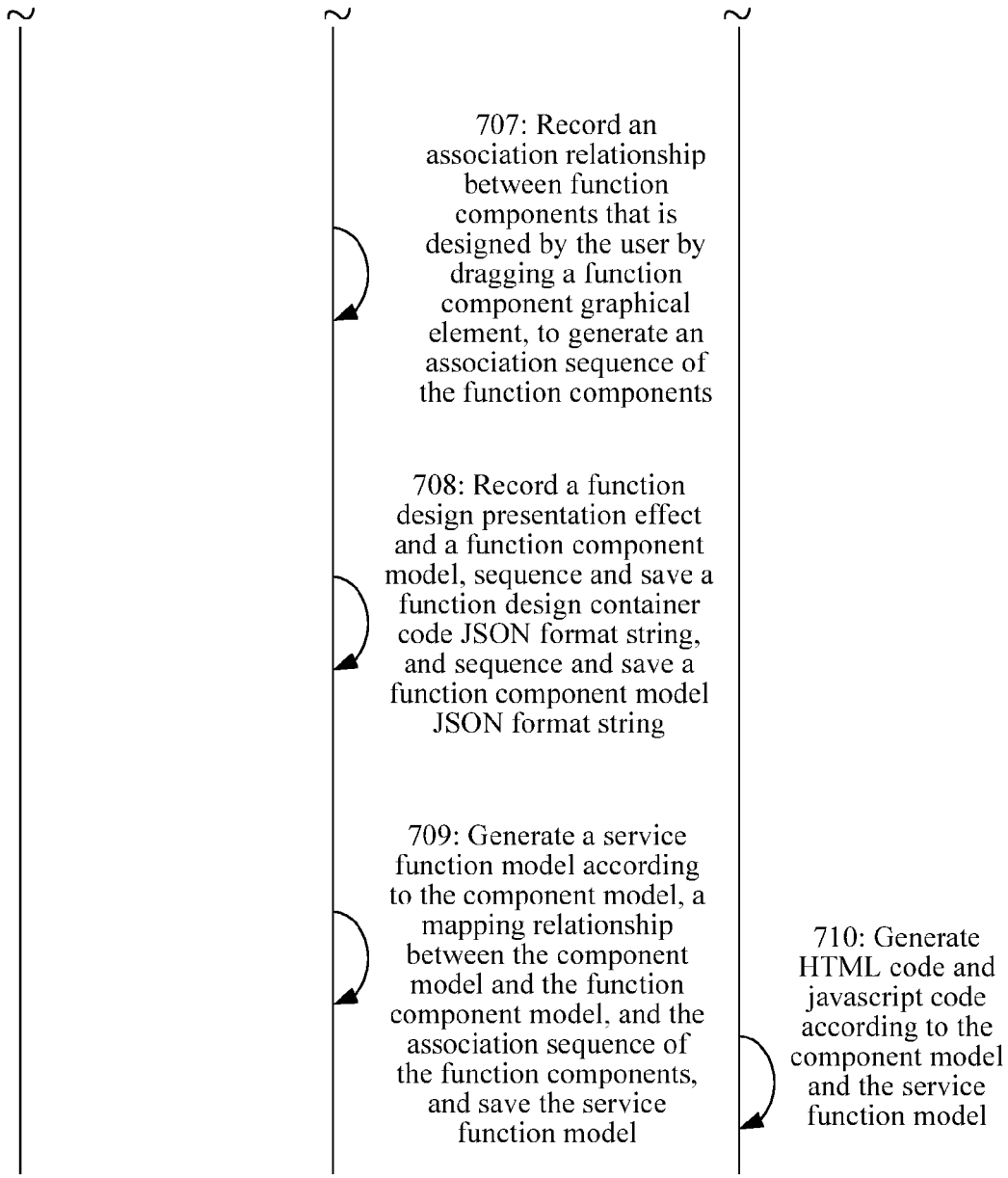

FIG. 7A and FIG. 7B are a schematic flowchart of Example 1 of creating an application by using an application creation apparatus according to an embodiment of the present disclosure. As shown in FIG. 7A and FIG. 7B, Example 1 includes the following steps.

Step 701: A component design module records property information of an image UI component, a button UI component, and a picture-taking API component that are designed by a user, and updates a prestored component model.

Figure 8:
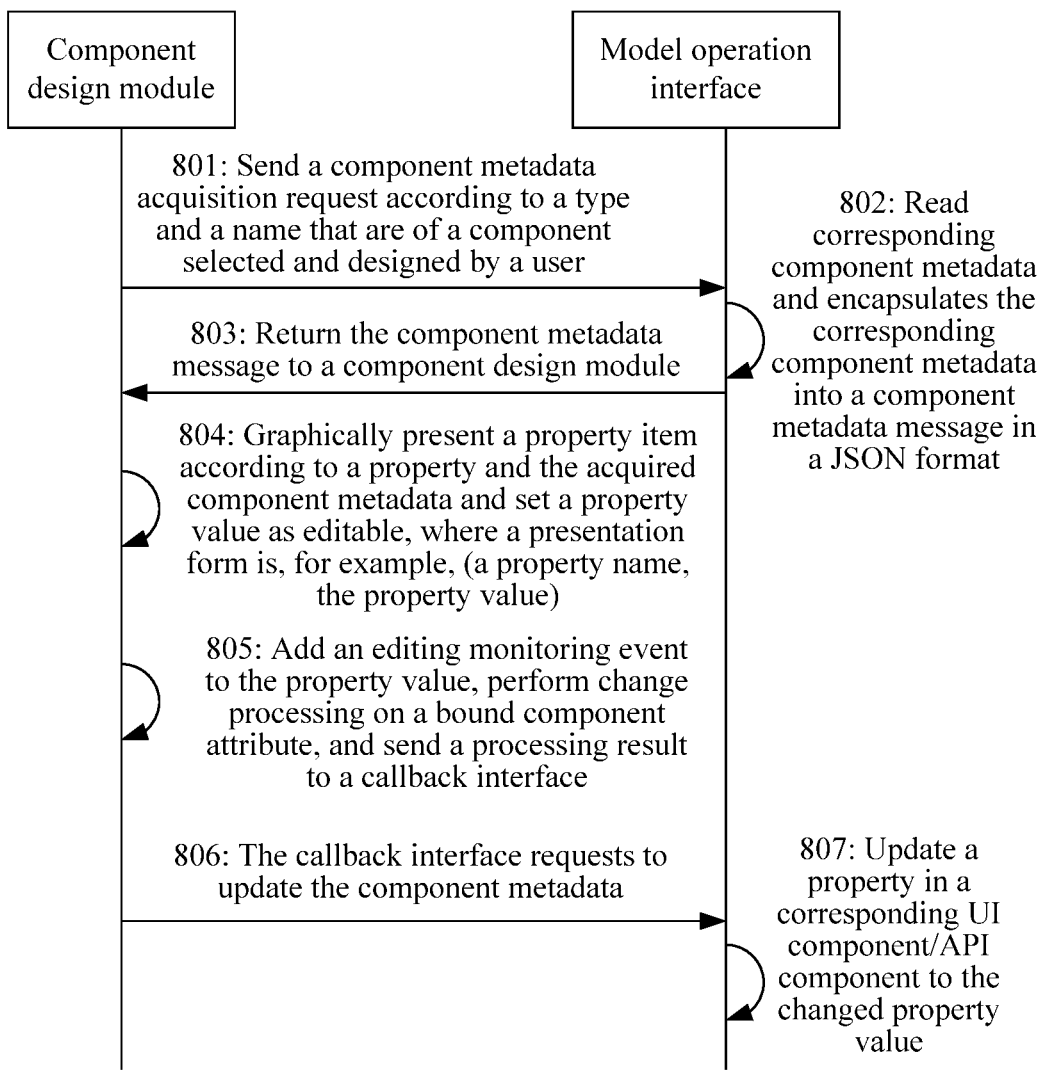
FIG. 8 is a schematic flowchart of an example of updating a component model by using an application creation apparatus according to an embodiment of the present disclosure.

The prestored component model includes a UI component, an API component, and a model operation interface. FIG. 8 is a schematic flowchart of an example of updating a component model by using an application creation apparatus according to an embodiment of the present disclosure. As shown in FIG. 8, the example includes the following steps.

Step 801: The component design module sends a component metadata acquisition request to the model operation interface according to a type and a name that are of a component selected and designed by the user.

Step 802: The model operation interface reads corresponding component metadata according to the type and the name that are of the component selected and designed by the user, and encapsulates the corresponding component metadata into a component metadata message in a JavaScript Object Notation (JSON) format.

Step 803: The model operation interface returns the component metadata message to the component design module.

Step 804: The component design module graphically presents a property item according to a property and the acquired component metadata and sets a property value as editable, where a presentation form is, for example, (a property name, the property value).

Step 805: The component design module adds an editing monitoring event to the property value, performs change processing on a bound component attribute, and sends a processing result to a callback interface, where a naming format of the callback interface is as follows:

```
Interface(String type, String name, String propertyName, String
propertyValue)
{
    //calling a model operation interface of a component to update
    component metadata
}
```

Step 806: The callback interface acquires a changed property value and requests the model operation interface to update the component metadata.

Step 807: The model operation interface updates a property in a corresponding UI component/API component with the changed property value.

In this example, a user adds an image UI component, a button UI component, and a picture-taking API component to a component design module in a dragging manner and sets properties of a component, such as presentation data, an icon, and a style. The component design module calls a model operation interface to automatically update property information corresponding to a component model. The user designs a function name of the image UI component as "changeImage", and designs an input parameter as "image"; designs a name property of a trigger event of the button UI component (namely, a "picture-taking" button) as "onClick", and designs an alias property as "click"; and designs a name of the picture-taking API component as "TakePicture" and designs a corresponding icon.

Step 702: The component design module requests a function design module to generate function component models of all components.

Step 703: The function design module generates a function component model according to a component model and establishes a mapping relationship between a component property of the component model and a function component property of the function component model.

The function design module requests component metadata of the image UI component, the button UI component, and the picture-taking API component from the component design module, and receives component metadata information returned by the component design module in response to the request. The returned metadata information is as follows:

```
{
{
    {
    ID      : "object1",
    Name    : "IMAGE",
        Type    : "UI",
        Icon    : "http://localhost/resources/apple.png"//an API component is a
        required item,
        Width: "80px",
        Height: "80px",
        Zindex: "1",
        X:  "124px",
        Y:  '219px"
    Functions:
    {
    function:
    {
    name: "changeSrc",
    alias: "changeImage",
    input:
    {
    parameter:{name:"src",alias:"image",default:"",nullable:"true"}
    },
        output: { }
    },
        Events:{ }
}
{
ID  : "object2",
Name: "takePicture",
Text:"takePicture"
Type: "UI",
Icon: "http://localhost/resources/gear.png"//an API component is a
required item,
Width: "80px",
Height : "20px",
    X:  "124px",
    Y:  '319px"
    Zindex: "2",
Functions: { input:{ }, output:{name:"imagepath",alias:"image"}},
    Events:   {name:"onClick",alias:"click"}
}
{
ID : "object3",
Name: "TakePicture",
Text: "takePicture"
    Type: "API",
    Icon: "http://localhost/resources/camera.png"//an API component is a
    required item,
    Width: "80px",
    Height: "20px",
    X:  "124px",
    Y:  '419px"
    Zindex: "3",
Functions       :
{
function:
{
name: "takePicture",
alias: "takePicture",
input:
{
Parameter:{ }
},
    Output:{name:" imageURL",alias:"imageURL"}
},
    Events:{ }
}
```

The function design module parses a returned component metadata information and separately acquires the component metadata of the image UI component, the button UI component, and the picture-taking API component. The function design module generates, by using a key component identifier (a component ID)+"function", key function component identifiers corresponding to all the components, that is, what are generated are as follows:

an identifier of the image UI function component: "object1 function";

an identifier of the button UI function component: "object2 function"; and an identifier of the picture-taking API function component: "object3 function".

The function design module sets an event that is supported by a function component and that is corresponding to a "picture-taking" button as "click"; and sets a function property supported by the image UI function component as a function property of the image UI component designed by the user in step 701, namely,

```
function:
{
name: "changeSrc",
alias: "changeImage",
input:
{
Parameter:{name:"src",alias:"image",default:"",nullable:"true"}
}
}.
```

The function design module sets a function property supported by the button UI function component as a function property of the picture-taking API component designed by the user in step 701, namely,

```
function:
{
name: "takePicture",
alias: "takePicture",
input:
{
parameter: { }
},
    output: {name:"imageURL",alias:"imageURL"}
}
```

The function design module then acquires, according to an ID of each function component, outerHTML code corresponding to the component, and uses the outerHTML code as function component presentation code, and the following is an example of the function component presentation code.

Function component presentation code of the image UI function component is:

```
<div id="logicobject3" style="z-index: 3; width: 112px; height: 112px; "
logiconclick="objClicked(3)"logicondblclick="objDblClicked(3)"logiconmouseover="objMous
eOver(this);"logiconmouseout="objMouseOut(this);"class="yui-resize-hover yui-resize-knob
yui-resize yui-draggable" onclick="objClicked(3)"><img
id="logicobjectImg3 "style="position:absolute;width:100%;height:100%;"src="images/backgrou
nd/apple.jpeg"></div>
```

Function component presentation code of the button UI function component is:

```
<div id="logicobject2" style=" width: 89px; height: 32px; z-index: 2; logicleft: 85px;
logictop: 150px; text-align: left; visibility: visible; "
onclick="objClicked(2)"logicondblclick="objDblClicked(2)"logiconmouseover="objMouseOver
(this);"logiconmouseout="objMouseOut(this);"class="yui-resize-hover yui-resize-knob
yui-resize yui-draggable"><logica
id="logicobjectPushButton2"style="margin:0px;height:100%;width:100%;text-align:left;"
logichref="#" class="ui-btn ui-btn-icon-left ui-btn-hover-a ui-btn-corner-all ui-shadow
ui-btn-up-a"><span id="buttonandicon2" class="ui-btn-inner ui-btn-corner-all"
style="line-height:18px"><span class="ui-btn-text" id="buttontext2">take picture</span> <span
id="buttonicon2" class="ui-icon ui-icon-gear ui-icon-shadow"></span></span></logica>
```

Function component presentation code of the picture-taking API function component is:

```
<div id="TakePicture" lang="API" align="addDsJSAPI('COSMOS', ", 'takePicture',
'username', ", 'images/toolbox/mobile_picture.png');" dir="TakePicture"
onmouseover="switchTopBarBg(this,'over','apibg.png');"
onmouseout="switchTopBarBg(this,'over',");" class="div_api" title="TakePicture"
style="background-image:url(http://localhost:8088/mashupIDE/images/newstyle/apibg.png); ">
<table> <tbody><tr><td style="height:30px;cursor:move"
align="center"><imgclass="img_api_td"src="images/toolbox/mobile_picture.png"></td></tr><t
r><td align="center"><div class="td_api"><a style=""
href="javascript:void(0)"title="ViewDetail"onclick="showApiDetail('TakePicture');">TakePictur
e</a><a></div></td></tr> </tbody></table></div>
```

The function design module then sets a display layer Zindex value of each function component to a Zindex property value of a component designed by the user. For example, a Zindex value of the image UI function component is set to 1, a Zindex value of the button UI function component is set to 2, and a Zindex value of the picture-taking API function component is set to 3.

The function design module then sets a display location property value of each function component to a display location property value of a component designed by the user. For example, an x property value of the image UI function component is set to 124 px, and a y property value of the image UI function component is set to 219 px; an x property value of the button UI function component is set to 124 px, and a y property value of the button UI function component is set to 319 px; and an x property value of the picture-taking API function component is set to 124 px, and a y property value of the picture-taking API function component is set to 419 px.

By using the foregoing steps, the function design module completes generation of the function component model, and saves the image UI function component, the button UI function component, and the picture-taking API function component that are generated.

Step 704: The function design module establishes a mapping relationship according to a key component identifier and a key function component identifier.

For example, the mapping relationship is as follows:
{object1:object1_function,object:object2_function,object3:object3 function}

Step 705: Graphically display the function component model on the function design module.

A DIV container element is added, in the function design module, to each function component model, a location of the added DIV container element is a value of a coordinate property (x, y) of the function component model, an ID of the DIV container element is set as a function component ID, and innerHTML code of the DIV container element is set as HTML code of the function component model. A final presentation effect is completely the same as a component presentation effect in the component design module.

Step 706: Automatically associate a property of the function component model and graphically map the property to a location near a right side of a graphically displayed function component (namely, a function component interface graphical element).

For example, a specific procedure includes reading, by the function design module from the function component model, an event property value, namely "click", corresponding to a picture-taking button; adding a DIV presentation container to a right side of a picture-taking button function component; setting a DIV text property as "click"; adding a uniform resource locator (Uniform/Universal Resource Locator (URL)) "http://localhost/resources/gear.png" of an image (IMG) element to an event presentation container, to identify the function component as an event function component; reading a function property corresponding to the picture-taking API function component, where for a property value, reference is made to API component metadata in a returned message; adding a DIV container to a right side of a picture-taking API function design component; setting a DIV text property as "output"; and adding a URL "http://localhost/resources/output.png" of an IMG element to the DIV presentation container, to identify the function component as an API output unit.

Step 707: The function design module records an association relationship between function components that is designed by the user by dragging a function component graphical element, to generate an association sequence of the function components.

The user drags a function component graphical element to a target associated component, and the function design module automatically draws a line to connect a source component and a target component to complete association between the function components, and establishes the association relationship to generate the association sequence of the function components. In this example, the generated association sequence of the function components is, for example, {object2.click: object3.takePicture, object3.out:object1}

Step 708: The function design module records a function design presentation effect and a function component model, sequences and saves a function design container code JSON format string, and sequences and saves a function component model JSON format string.

Step 709: The function design module generates a service function model according to the component model, a mapping relationship between the component model and the function component model, and the association sequence of the function components, and saves the service function model.

In this example, the generated service function model is as follows:

```
<function>
    <component>
        <id>object2</id>
        <event>
            <name>click</event>
            <component>
                <id>object3<id>
                <function>
                    <priority>1</priority>
                    <name>takePicture<name>
                    <parameter>
                        <name></name>
                        <from> </from>
                    </parameter>
                    <out>
                        <id>object1</id>
                    </out>
                </function>
            </component>
        </event>
    </component>
</function>
```

Step 710: A code generating module generates Hypertext Markup Language (HTML) code and javascript code according to the component model and the service function model.

In the foregoing example, a function design module displays a function component graphical element in a two-dimensional manner and establishes, by receiving a drag operation performed by a user on the function component graphical element, an association relationship between different function component graphical elements in a to-be-created application; further, a service function model used for representing a program function is generated with reference to the function component graphical elements and the association relationship, and executable code of the application is generated according to the component model and the service function model. Therefore, component design and service function design are combined with each other, and code-free development performed by the user based on a graphical interface is implemented in a complete application development process, so that persons of ordinary skill can also easily and rapidly develop a program function, and development efficiency is high.

EXAMPLE 2

In this example, it is assumed that related components that need to be used by a to-be-created application are the same as those in Example 1.

Figure 9A:
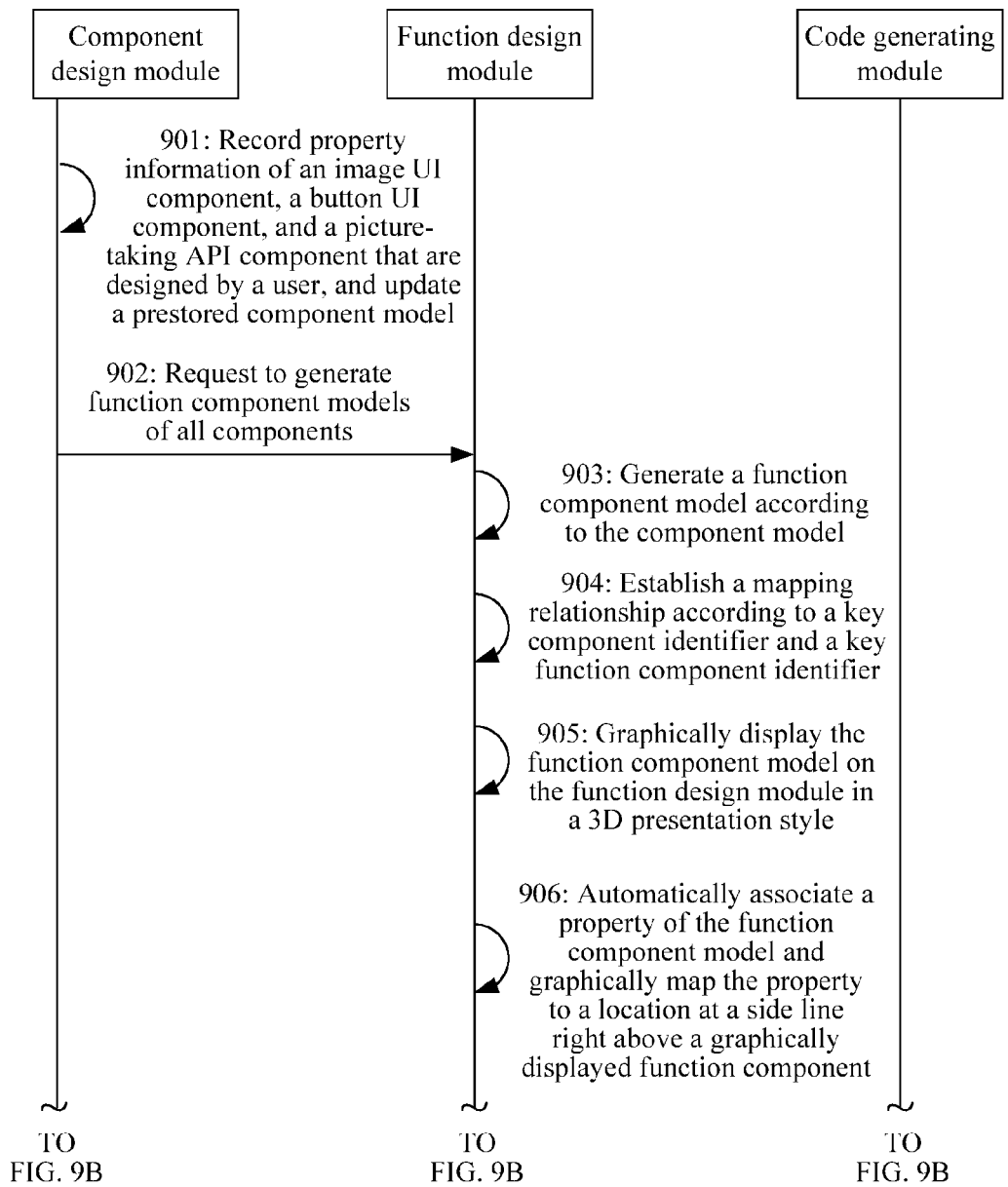

FIG. 9A and FIG. 9B are a schematic flowchart of Example 2 of creating an application by using an application creation apparatus according to an embodiment of the present disclosure. As shown in FIG. 9A and FIG. 9B, Example 2 includes the followings steps.

Step 901: A component design module records property information of an image UI component, a button UI component, and a picture-taking API component that are designed by a user, generates a component model, renders a corresponding predefined graphical element according to the component model, and regenerates a component interface graphical element.

Step 902: The component design module requests a function design module to generate function component models of all components.

Step 903: The function design module generates a function component model according to the component model.

Step 904: The function design module establishes a mapping relationship according to a key component identifier and a key function component identifier.

The foregoing steps 901 to 904 may be performed in a same manner as Example 1.

Step 905: Graphically display the function component model on the function design module in a three-dimensional (3D) presentation style.

A DIV container element is added, in the function design module, to each function component model, a location of the added DIV container element is a value of a coordinate property (x, y) of the function component model, an ID of the DIV container element is set as a function component ID, and inner HTML code of the DIV container element is set as HTML code of the function component model. A final presentation effect is completely the same as a component presentation effect in the component design module; a style zindex property value of a container of an API component is reset to 0, so that a picture-taking API component is displayed at a bottom layer; a style property of a function component container is set, and a 3D presentation style of cascading style sheets 3 (CSS3) is added, so that function components are presented hierarchically in a 3D manner.

Code of the added style CSS is, for example,
{
perspective: 500px;
perspective-origin: 150px 500px;
transform-origin: 150px 500px;
animation: scrollText 200s linear infinite;
-webkit-box-shadow: 0 2px 10px rgba(0, 0, 0, 0.4),inset 0 4px 4px 0 #ffffff,inset 0 2px
4px 0 rgba(0, 0, 0, 0.4),inset 0 −2px 2px 0 rgba(255, 255, 255, 0.9);
-moz-box-shadow: 0 2px 10px rgba(0, 0, 0, 0.4),inset 0 4px 4px 0 #ffffff,inset 0 2px 4px
0 rgba(0, 0, 0, 0.4),inset 0 −2px 2px 0 rgba(255, 255, 255, 0.9);
-moz-border-radius: 6px;
-webkit-border-radius: 6px;
@keyframes scrollText {
0% { transform: rotateX(45deg) translateY(500px); }
100% { transform: rotateX(45deg) translateY(−8300px); }
}
}

Step 906: Automatically associate a property of the function component model and graphically map the property to a location at a side line right above a graphically displayed function component (namely, a function component interface graphical element).

For example, the function design module reads, from the function component model, an event property value, namely "click", corresponding to a picture-taking button; adds a DIV presentation container to an upper left part of a picture-taking button function component; sets a DIV text property as "click"; and adds a three-dimensional style of CSS3 to an event presentation container, so that an event unit is presented in a three-dimensional manner.

Step 907: The function design module records an association relationship between function components that is designed by the user by performing color notation on a function component graphical element, to generate an association sequence of the function components.

For example, the user clicks a click event unit of a picture-taking button component; the function design module displays a color selector including a list of common colors; the user clicks a target color to select a notation color; a code (#11ff11) of the notation color, an ID of a component that has undergone color notation, an event name {object2.click}, and a time stamp (7/15/2012 10:13:26 PM) are recorded; and a graphical element notation sequence is generated according to the ID of the component that has undergone color notation, the notation color, and the time stamp, and is, for example, {[object2, click, 7/15/2012 10:13:26 PM, #11ff11], [object3,takePicture, 7/15/2012 10:13:27 PM, #11ff11], [object1, 7/15/2012 10:13:28 PM, #11ff11]}

The function design module obtains, by means of analysis, a service function step according to the graphical element notation sequence, automatically notates an order code, and generates the association sequence of the function components. For example, a click unit of the picture-taking button function component is notated as 1, a picture-taking API function component is annotated as 2, an image function component is notated as 3, and the generated association sequence of the function components is: {object2.click: object3.takePicture, object3.out:object1}.

Step 908: The function design module records a function design presentation effect and the function component model, sequences and saves a function design container code JSON format string, and sequences and saves a function component model JSON format string.

Step 909: The function design module generates a service function model according to the component model, a mapping relationship between the component model and the function component model, and the association sequence of the function components, and saves the service function model.

Step 910: A code generating module generates HTML code and javascript code according to the component model and the service function model.

The foregoing steps 908 to 910 may be performed in the same manner as Example 1.

In the foregoing example, a function design module displays a function component graphical element in a 3D manner and establishes, by receiving a color notation operation performed by a user on the function component graphical element, an association relationship between different function component graphical elements in a to-be-created application; further, a service function model used for representing a program function is generated with reference to the function component graphical elements and the association relationship, and executable code of the application is generated according to a component model and the service function model. Therefore, component design and service function design are combined with each other, and code-free development performed by the user based on a graphical interface is implemented in a complete application development process, so that persons of ordinary skill can also easily and rapidly develop a program function, and development efficiency is high.

Figure 10:
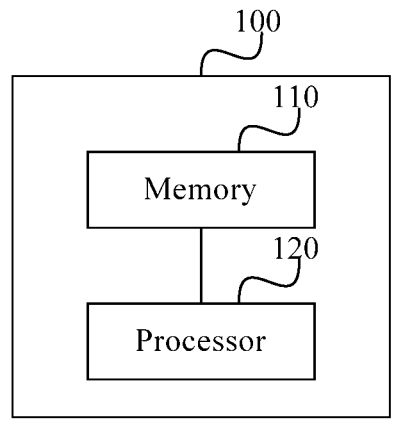
FIG. 10 is a schematic structural diagram of an application creation apparatus according to another embodiment of the present disclosure.

FIG. 10 is a schematic structural diagram of an application creation apparatus 100 according to another embodiment of the present disclosure. The application creation apparatus is disposed on a terminal having a display device. As shown in FIG. 10, the application creation apparatus 100 includes a memory 110 and a processor 120 connected to the memory 110, where the memory 110 stores a set of program code, and the processor 120 is configured to invoke the program code stored in the memory 110, so as to execute the following operations: receiving a property value that is of a component property and that is configured by a user, generating a component model according to the property value of the component property, and rendering, according to the component model, a predefined graphical element that is of the component model and that is on a component interface, to acquire a component interface graphical element corresponding to the property value of the component property; mapping the component model as a function component model, graphically displaying the function component model as a function component graphical element according to the component interface graphical element, graphically establishing an association relationship between different function component graphical elements in a to-be-created application according to an operation performed by the user on the function component graphical element, and generating a service function model according to the association relationship between the different function component graphical elements in the to-be-created application, where the function component graphical element includes a function component interface graphical element and a function component property graphical element affiliated to the function component interface graphical element; and generating executable code of the application according to the component model and the service function model.

A specific procedure of creating an application by the application creation apparatus according to this embodiment of the present disclosure is the same as an application creation method according to an embodiment of the present disclosure, and therefore, details are not repeatedly described herein.

According to the application creation apparatus in this embodiment of the present disclosure, a function component graphical element is created by using a component model configured by a user by using a graphical component interface, and an association relationship, during implementation of an application, between function component graphical elements is determined according to an operation performed by the user on the function component graphical element; further, a service function model used for representing a program function is generated with reference to the function component graphical element and the association relationship, and executable code of the application is generated according to the component model and the service function model. Therefore, component design and service function design are combined with each other, which implements, in a complete application creation process, code-free development performed by the user based on a graphical interface, and simplifies an application creation process, so that application creation efficiency is high.

Further, in the application creation apparatus in this embodiment of the present disclosure, the component property includes a component interface presentation format, component interface presentation data, a component display layer, location coordinates of a component, a name of a component-triggering event, a name of an external interaction interface of the component, a name of an interface-related parameter, and a component type.

Further, in the application creation apparatus in this embodiment of the present disclosure, the processor is further configured to invoke the program code stored in the memory, to execute the following operations: generating component model code according to a property value of the component interface presentation format in the component property and a property value of the component interface presentation data in the component property; and generating the component interface graphical element according to the component model code.

Further, in the application creation apparatus in this embodiment of the present disclosure, the processor is further configured to invoke the program code stored in the memory, to execute the following operations: mapping a component property of the component model as a function component property of the function component model; mapping a key component identifier of the component model as a key function component identifier of the function component model; and acquiring, according to the key component identifier of the component model, function component presentation code corresponding to the key function component identifier; or generating, according to a property value of a component presentation format of the component model corresponding to the key component identifier and a property value of component interface presentation data, function component presentation code corresponding to the key function component identifier; and rendering, according to location coordinates of the component model corresponding to the key component identifier and at location coordinates corresponding to a function component interface, the function component graphical element according to the function component presentation code.

Further, in the application creation apparatus in this embodiment of the present disclosure, the processor is further configured to invoke the program code stored in the memory, to execute the following operations: calling a graphical operation interface of a drawing tool preset on the terminal, and rendering, according to the location coordinates corresponding to the key component identifier and at the location coordinates corresponding to the function component interface, the function component interface graphical element according to the function component presentation code; and automatically associating and mapping the function component property graphical element according to the component property of the component model.

Further, in the application creation apparatus in this embodiment of the present disclosure, the processor is further configured to invoke the program code stored in the memory, to execute the following operations: automatically creating a three-dimensional model of the function component graphical element by using a three-dimensional presentation space capability of the drawing tool preset on the terminal, and performing hierarchical display according to a component display layer configured by the user.

Further, in the application creation apparatus in this embodiment of the present disclosure, the processor is further configured to invoke the program code stored in the memory, to execute the following operations: searching for all function component graphical elements whose component type is an API; setting a display layer of the API-type function component interface graphical element to a bottom layer value, so that the API-type function component interface graphical element is displayed at a bottom layer; and setting a display layer of an input and output property graphical element corresponding to the API-type function component interface graphical element to 1 plus the display layer of the API-type function component interface graphical element, so that the affiliated input and output property graphical element is superimposed and displayed on the API-type function component interface graphical element; and searching for all function component graphical elements whose component type is a UI; and displaying the UI-type function component graphical element according to a display layer of the UI-type function component graphical element.

Further, in the application creation apparatus in this embodiment of the present disclosure, the processor is further configured to invoke the program code stored in the memory, to execute the following operation: controlling, by changing a display layer of the function component graphical element, the function component graphical element to be in a displayed state or in a hidden state.

Further, in the application creation apparatus in this embodiment of the present disclosure, the processor is further configured to invoke the program code stored in the memory, to execute the following operations: receiving a notation color message used by the user to perform color notation on the function component graphical element, where the notation color message includes a notation color, a notation time stamp, and a key function component identifier that is corresponding to the function component graphical element; generating a graphical element notation sequence according to the notation color, the notation time stamp, and the key function component identifier that is corresponding to the function component graphical element; and determining the association relationship between the different function component graphical elements in the to-be-created application according to the graphical element notation sequence.

Further, in the application creation apparatus in this embodiment of the present disclosure, the processor is further configured to invoke the program code stored in the memory, to execute the following operations: changing a foreground color of the function component graphical element to the notation color; and automatically generating, according to the foreground color of the function component graphical element and the notation time stamp corresponding to the function component graphical element, a notation order code used to indicate application function logic.

Further, in the application creation apparatus in this embodiment of the present disclosure, the processor is further configured to invoke the program code stored in the memory, to execute the following operations: automatically adding a container element to the function component graphical element, and setting text of the container element as the notation order code.

Further, in the application creation apparatus in this embodiment of the present disclosure, the processor is further configured to invoke the program code stored in the memory, to execute the following operations: receiving a drag operation performed by the user, automatically drawing a line to connect a source function component graphical element and a target function component graphical element that are corresponding to the drag operation, and recording the association relationship between the different function component graphical elements in the to-be-created application.

Further, in the application creation apparatus in this embodiment of the present disclosure, the processor is further configured to invoke the program code stored in the memory, to execute the following operation: adding any string to the key component identifier of the component model to generate the key function component identifier.

Further, in the application creation apparatus in this embodiment of the present disclosure, the processor is further configured to invoke the program code stored in the memory, to execute the following operations: generating an association sequence of the function component graphical elements according to the association relationship between the different function component graphical elements in the to-be-created application; and generating the service function model according to the association sequence of the graphical elements, the component model, and a mapping relationship between the component model and the function component graphical element.

Further, in the application creation apparatus in this embodiment of the present disclosure, the graphically established association relationship between the different function component graphical elements in the to-be-created application is hierarchically presented in a tree structure or presented in a graded manner.

Further, in the application creation apparatus in this embodiment of the present disclosure, the function component graphical element has a same presentation effect as the corresponding component interface graphical element.

Further, in the application creation apparatus in this embodiment of the present disclosure, the processor is further configured to invoke the program code stored in the memory, to execute the following operations: reading, from the service function model, a property of a UI-type function component graphical element; acquiring, from a component model of a corresponding UI component on the component interface, a configured code generating template corresponding to the UI-type function component graphical element; and generating instant rendering component code according to the property of the UI-type function component graphical element and the corresponding configured code generating template; reading, from the service function model, a property of an API-type function component graphical element; acquiring, from a component model of a corresponding API component on the component interface, a configured code generating template corresponding to the API-type function component graphical element, and generating reference class library code according to a reference library declared by the API component; and generating API function code according to the property of the API-type function component graphical element, the corresponding configured code generating template, and the reference class library code; generating, according to the property of the function component graphical element and the association relationship between the different function component graphical elements in the to-be-created application, script code used to control interaction between the UI component and the API component; and generating the executable code of the application according to the instant rendering component code, the API function code, and the script code.

Figure 11:
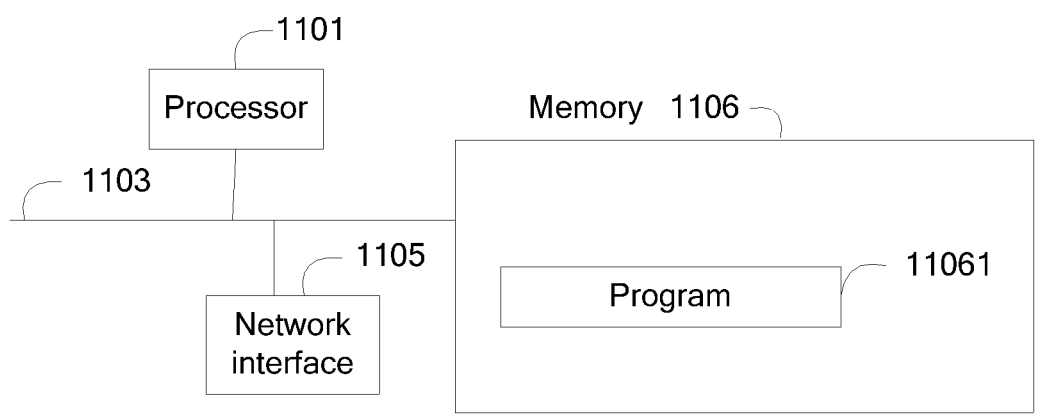
FIG. 11 is a schematic structural diagram of an application creation apparatus according to another embodiment of the present disclosure.

FIG. 11 is a schematic structural diagram of an application creation apparatus according to another embodiment of the present disclosure. The apparatus includes at least one processor 1101 (for example, a central processing unit (CPU)), at least one network interface 1105 or another communications interface, a memory 1106, and at least one communications bus 1103 configured to implement connection and communication between these apparatuses. The processor 1101 is configured to execute an executable module, for example, a computer program, stored in the memory 1106. The memory 1106 may include a high-speed random access memory (RAM), or may further include a non-volatile memory, for example, at least one magnetic disk memory. Communication connection between a system gateway and at least one other network element may be implemented by using the at least one network interface 1105 (which may be wired or wireless), and the Internet, a wide area network, a local area network, a metropolitan area network, and the like may be used.

In some implementation manners, the memory 1106 stores a program 11061, the program 11061 may be executed by the processor 1101, and the program includes receiving a property value that is of a component property and that is configured by a user, generating a component model according to the property value of the component property, and rendering, according to the component model, a predefined graphical element that is of the component model and that is on a component interface, to acquire a component interface graphical element corresponding to the property value of the component property; mapping the component model as a function component model, graphically displaying the function component model as a function component graphical element according to the component interface graphical element, graphically establishing an association relationship between different function component graphical elements in a to-be-created application according to an operation performed by the user on the function component graphical element, and generating a service function model according to the association relationship between the different function component graphical elements in the to-be-created application; and generating executable code of the application according to the component model and the service function model.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a RAM, a magnetic disk, or an optical disc.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. An application creation method, applied to a terminal having a display device, wherein the method comprises:
   receiving, by the terminal, a property value of a component property configured by a user;
   generating a component model according to the property value of the component property;
   generating a component interface graphical element corresponding to the property value of the component property;
   mapping the component model as a function component model;
   creating a three-dimensional model of the function component graphical element by using a three-dimensional presentation space capability of a drawing tool preset on the terminal;
   searching for all function component graphical elements whose component type is an application programming interface (API) type;
   setting a display layer of the API-type function component interface graphical element to a bottom layer value such that the API-type function component interface graphical element is displayed at a bottom layer;
   setting a display layer of an input and output property graphical element corresponding to the API-type function component interface graphical element to one plus the display layer of the API-type function component interface graphical elementsuch that the affiliated input and output property graphical element is superimposed and displayed on the API-type function component interface graphical element;
   searching for all function component graphical elements whose component type is a visual user interface (UI) type;
   displaying the UI-type function component graphical element according to a display layer of the UI-type function component graphical element;
   establishing an association relationship between different function component graphical elements in a to-be-created application according to an operation performed by the user on the function component graphical element;
   generating a service function model according to the association relationship between the different function component graphical elements in the to-be-created application; and
   generating executable code of the to-be-created application according to the component model and the service function model.

2. The application creation method according to claim 1, wherein generating the component interface graphical element corresponding to the property value of the component property comprises:
   generating component model code according to a property value of a component interface presentation format in the component property and a property value of component interface presentation data in the component property; and
   generating a component interface graphical element according to the component model code.

3. The application creation method according to claim 1, wherein mapping the component model as a function component model comprises:
   mapping a component property of the component model as a function component property of the function component model;
   mapping a key component identifier of the component model as a key function component identifier of the function component model; and
   acquiring, according to the key component identifier of the component model, function component presentation code corresponding to the key function component identifier, or generating, according to a property value of a component presentation format of the component model corresponding to the key component identifier and a property value of component interface presentation data, function component presentation code corresponding to the key function component identifier, and wherein displaying the UI-type function component graphical element further comprises rendering, according to location coordinates of the component model corresponding to the key component identifier and at location coordinates corresponding to a function component interface, the function component graphical element according to the function component presentation code.

4. The application creation method according to claim 3, wherein the method further comprises acquiring, according to the key component identifier of the component model, the function component presentation code corresponding to the key function component identifier.

5. The application creation method according to claim 3, wherein the method further comprises generating, according to the property value of the component presentation format of the component model corresponding to the key component identifier and the property value of the component interface presentation data, the function component presentation code corresponding to the key function component identifier.

6. The application creation method according to claim 3, wherein rendering, according to the location coordinates of the component model corresponding to the key component identifier and at location coordinates corresponding to the function component interface, the function component graphical element according to the function component presentation code comprises:

calling a graphical operation interface of a droving tool preset on the terminal;

rendering, according to the location coordinates corresponding to the key component identifier and at the location coordinates corresponding to the function component interface, a function component interface graphical element according to the function component presentation code; and automatically associating and mapping a function component property graphical element according to the component property of the component model.

7. The application creation method according to claim 1, wherein generating the service function model according to the association relationship between the different function component graphical elements in the to-be-created application comprises:

generating an association sequence of the function component graphical elements according to the association relationship between the different function component graphical elements in the to-be-created application; and generating the service function model according to the association sequence of the function component graphical elements, the component model, and a mapping relationship between the component model and the function component graphical element.

8. An application creation method, applied to a terminal having a display device, comprising:

receiving, by the terminal, a property value of a component property configured by a user;

generating a component model according to the property value of the component property;

generating a component interface graphical element corresponding to the property value of the component property;

mapping the component model as a function component model;

graphically displaying the function component model as a function component graphical element according to the component interface graphical element;

establishing an association relationship between different function component graphical elements in a to-be-created application according to an operation performed by the user on the function component graphical element;

generating a service function model according to the association relationship between the different function component graphical elements in the to-be-created application;

reading, from the service function model, a property of a visual user interface (UI)-type function component graphical element;

acquiring, from a component model of a corresponding UI component on the component interface, a configured code generating template corresponding to the UI-type function component graphical element;

generating instant rendering component code according to the property of the UI-type function component graphical element and the corresponding configured code generating template;

reading, from the service function model, a property of an application programming interface (API)-type function component graphical element;

acquiring, from a component model of a corresponding API component on the component interface, a configured code generating template corresponding to the API-type function component graphical element;

generating reference class library code according to a reference library declared by the API component;

generating API function code according to the property of the API-type function component graphical element, the corresponding configured code generating template, and the reference class library code;

generating, according to the property of the function component graphical element and the association relationship between the different function component graphical elements in the to-be-created application, script code used to control interaction between the UI component and the API component; and generating the executable code of the to-be created application according to the instant rendering component code, the API function code, and the script code.

9. A terminal device which is capable of creating an application, comprising:

a storage device storing computer executable program codes;

a communication interface; and a processor, coupled with the storage device and the communication interface, wherein the program codes comprise instructions which, when executed by the processor, cause the processor to:

receive a property value of a component property configured by a user;

generate a component model according to the property value of the component property;

generate a component interface graphical element corresponding to the property value of the component property;

map the component model as a function component model;

graphically display the function component model as a function component graphical element according to the component interface graphical element;

receive a notation color message used by the user to perform color notation on the function component graphical element, wherein the notation color message comprises a notation color, a notation time stamp, and a key function component identifier that is corresponding to the function component graphical element;

generate a graphical element notation sequence according to the notation color, the notation time stamp, and the key function component identifier that is corresponding to the function component graphical element;

determine an association relationship between different function component graphical elements in a to-be-created application according to the graphical element notation sequence;

generate a service function model according to the association relationship between the different function component graphical elements in the to-be-created application; and generate executable code of the to-be-created application according to the component model and the service function model.

10. The terminal device according to claim 9, wherein to determine the association relationship between the different function component graphical elements in the to-be-created application according to the graphical element notation sequence, the program codes further comprise instructions which, when executed by the processor, cause the processor to:

change a foreground color of the function component graphical element to the notation color; and generate, according to the foreground color of the function component graphical element and the notation time stamp corresponding to the function component graphical element, a notation order code used to indicate application function logic.

11. The terminal device according to claim 9, wherein the program codes further comprise instructions which, when executed by the processor, cause the processor to:

generate component model code according to a property value of a component interface presentation format in the component property and a property value of component interface presentation data in the component property; and generate a component interface graphical element according to the component model code.

* * * * *

UNITED STATES PATENT AND TRADEMARK OFFICE
CERTIFICATE OF CORRECTION

PATENT NO. : 9,720,658 B2
APPLICATION NO. : 14/953912
DATED : August 1, 2017
INVENTOR(S) : Qingwei Zhao It is certified that error appears in the above-identified patent and that said Letters Patent is hereby corrected as shown below:

In the Claims

Column 35, Line 34, Claim 6 should read:
calling a graphical operation interface of a drawing tool Signed and Sealed this
Tenth Day of April, 2018

Andrei Iancu
*Director of the United States Patent and Trademark Office*